US012593874B2

(12) United States Patent
Gasparyan et al.

(10) Patent No.: US 12,593,874 B2
(45) Date of Patent: Apr. 7, 2026

(54) NON-COMBUSTIBLE AEROSOL DELIVERY SYSTEM

(71) Applicant: Nicoventures Trading Limited, London (GB)

(72) Inventors: Hripsime Gasparyan, London (GB); Simon James Copley, St. Ives (GB); Mathew John Price, St. Ives (GB); Matthew Maurice Homburg, St. Ives (GB)

(73) Assignee: Nicoventures Trading Limited (GB)

( * ) Notice: Subject to any disclaimer, the term of this patent is extended or adjusted under 35 U.S.C. 154(b) by 446 days.

(21) Appl. No.: 18/002,150

(22) PCT Filed: Jun. 16, 2021

(86) PCT No.: PCT/GB2021/051531
§ 371 (c)(1),
(2) Date: Dec. 16, 2022

(87) PCT Pub. No.: WO2021/255454
PCT Pub. Date: Dec. 23, 2021

(65) Prior Publication Data
US 2023/0218007 A1     Jul. 13, 2023

(30) Foreign Application Priority Data
Jun. 17, 2020     (GB) ..................................... 2009251

(51) Int. Cl.
*A24F 40/485*     (2020.01)
*A24F 7/00*     (2006.01)
(Continued)

(52) U.S. Cl.
CPC .............. *A24F 40/485* (2020.01); *A24F 7/00* (2013.01); *A24F 13/00* (2013.01); *B01D 39/16* (2013.01);
(Continued)

(58) Field of Classification Search
None
See application file for complete search history.

(56) References Cited

U.S. PATENT DOCUMENTS 9,402,422 B2     8/2016   Shenkal
10,470,498 B2     11/2019   Shenkal et al.
(Continued)

FOREIGN PATENT DOCUMENTS

EP     3721726 A1     10/2020
WO     9423599 A1     10/1994
(Continued)

OTHER PUBLICATIONS

"International Preliminary Report on Patentability received for PCT Patent Application No. PCT/GB2021/051525, mailed on Dec. 29, 2022", 9 pages.
(Continued)

*Primary Examiner* — Cynthia Szewczyk
(74) *Attorney, Agent, or Firm* — Merchant & Gould P.C.

(57)     ABSTRACT
There is provided a non-combustible aerosol delivery system for filtering exhaled breath, the aerosol delivery system including a power source; a mouthpiece; a filter unit; an inhalate airflow path adapted to convey vapor generated by the aerosol delivery system to the user during an inhalation, and an exhalate airflow path adapted to convey breath from the user to the filter unit during an exhalation into the aerosol delivery system.

18 Claims, 20 Drawing Sheets

(51) Int. Cl.

| | |
|---|---|
| *A24F 13/00* | (2006.01) |
| *B01D 39/16* | (2006.01) |
| *B01D 39/20* | (2006.01) |
| *B01D 46/00* | (2022.01) |

(52) U.S. Cl.

CPC ....... *B01D 39/2017* (2013.01); *B01D 46/003* (2013.01); *B01D 46/0038* (2013.01); *B01D 2239/045* (2013.01)

(56) References Cited

U.S. PATENT DOCUMENTS

| | | | | |
|---|---|---|---|---|
| 10,588,344 | B2 | 3/2020 | Shenkal et al. | |
| 10,617,148 | B2 | 4/2020 | Shenkal et al. | |
| 2015/0342259 | A1* | 12/2015 | Baker | A24F 40/485 131/329 |
| 2016/0219932 | A1* | 8/2016 | Glaser | A24F 40/485 |
| 2016/0270446 | A1* | 9/2016 | Shenkal | H05B 3/40 |
| 2019/0247606 | A1 | 8/2019 | Williams | |
| 2020/0154760 | A1 | 5/2020 | Prog et al. | |
| 2020/0170295 | A1 | 6/2020 | Grimm et al. | |
| 2020/0305505 | A1 | 10/2020 | Shenkal et al. | |
| 2021/0127736 | A1 | 5/2021 | Grimm | |
| 2021/0145063 | A1* | 5/2021 | Perrins | A24F 7/00 |

FOREIGN PATENT DOCUMENTS

| | | | | |
|---|---|---|---|---|
| WO | 9423600 | A1 | 10/1994 | |
| WO | WO-2017021836 | A1 * | 2/2017 | ........ A61M 16/0069 |
| WO | 2020123286 | A1 | 6/2020 | |
| WO | 2020154701 | A1 | 7/2020 | |
| WO | WO-2020198447 | A1 * | 10/2020 | |
| WO | 2021092086 | A1 | 5/2021 | |

OTHER PUBLICATIONS

International Search Report and Written Opinion for International Application No. PCT/GB2021/051531, mailed on Nov. 29, 2021, 20 pages.

* cited by examiner

NON-COMBUSTIBLE AEROSOL DELIVERY SYSTEM

PRIORITY CLAIM

The present application is a US National Phase of PCT/GB2021/051531, filed Jun. 16, 2021, which claims priority to Great Britain Application No. GB2009251.6, filed Jun. 17, 2020, which applications are incorporated herein by reference.

TECHNICAL FIELD

The present disclosure relates to a non-combustible aerosol delivery system.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Non-combustible aerosol delivery system including systems such as electronic cigarettes (e-cigarettes) are known. Some such systems contain a reservoir of a source liquid containing a formulation, typically including an active material such as nicotine, from which an aerosol is generated, e.g., through vaporization. An aerosol source for an aerosol delivery device may thus comprise an aerosol generating component such as a heater having a heating element arranged to receive source liquid from the reservoir, for example through wicking/capillary action. Other source materials may be similarly heated to create an aerosol, such as botanical matter, or a gel comprising an active ingredient and/or flavoring. Hence more generally, the e-cigarette may be thought of as comprising or receiving a payload for heat vaporization. Other systems may provide aerosols from substances which may comprise one or more active constituents, one or more flavors, one or more aerosol-former materials, and/or one or more other functional materials.

While, or before, a user inhales on the device, electrical power is supplied to the heating element to vaporize a portion of aerosolizable material in the vicinity of the heating element, to generate an aerosol for inhalation by the user. Such devices are usually provided with one or more air inlet holes located away from a mouthpiece end of the system. When a user sucks on a mouthpiece connected to the mouthpiece end of the system, air is drawn in through the inlet holes and past the aerosol generating component. There is a flow path connecting between the aerosol generating component and an opening in the mouthpiece so that air drawn past the aerosol source continues along the flow path to the mouthpiece opening, carrying some of the aerosol generated by the aerosol generating component with it. The aerosol-carrying air exits the aerosol delivery device through the mouthpiece opening for inhalation by the user.

In conventional systems the smoking process concludes with this aerosol-delivery stage. As of 2019 there was an estimated 3.6 million e-cigarette users in Great Britain alone (7.1% of the population).

SUMMARY

Improvements to this smoking process are disclosed herein.

In a first aspect of the disclosure there is provided a non-combustible aerosol delivery system for filtering exhaled breath, the aerosol delivery system comprising: a power source; a mouthpiece; a filter unit; an inhalate airflow path, adapted to convey vapor generated by the aerosol delivery system to the user during an inhalation, and an exhalate airflow path, adapted to convey breath from the user to the filter unit during an exhalation into the aerosol delivery system; wherein:

the inhalate airflow path and the exhalate airflow path are entirely distinct from each other; or the mouthpiece forms both a portion of the inhalate airflow path and a portion of the exhalate airflow path, and is configured to move between an inhalation position and an exhalation position, wherein in the inhalation position the mouthpiece is in fluid communication with the remainder of the inhalate airflow path and is not in fluid communication with the remainder of the exhalate airflow path, and wherein in the exhalation position the mouthpiece is not in fluid communication with the remainder of the inhalate airflow path and is in fluid communication with the remainder of the exhalate airflow path; or the non-combustible aerosol delivery system further comprises a diverter assembly, wherein the diverter assembly comprises a multi-flap valve, wherein the flaps of the multi-flap valve have a thickness of no greater than 0.7 mm.

In a second aspect of the disclosure there is provided a mouthpiece for use in a non-combustible aerosol delivery system, the mouthpiece comprising: an inhalate airflow path, adapted to convey vapor generated by the aerosol delivery system to the user during an inhalation, and an exhalate airflow path, adapted to convey breath from the user through the mouthpiece to a filter of the aerosol delivery system during an exhalation into the aerosol delivery system, wherein:

the inhalate airflow path and the exhalate airflow path are entirely distinct from each other; or the mouthpiece comprises an outlet which forms both a portion of the inhalate airflow path and a portion of the exhalate airflow path, and the mouthpiece is configured to move between an inhalation position and an exhalation position, wherein in the inhalation position the outlet is in fluid communication with the remainder of the inhalate airflow path and is not in fluid communication with the remainder of the exhalate airflow path, and wherein in the exhalation position the outlet is not in fluid communication with the remainder of the inhalate airflow path and is in fluid communication with the remainder of the exhalate airflow path; or the mouthpiece further comprises a diverter assembly, wherein the diverter assembly comprises a multi-flap valve, wherein the flaps of the multi-flap valve have a thickness of no greater than 0.7 mm.

The presently disclosed system enables a user to inhale an aerosol from the aerosol delivery system and then exhale through the system. In the present disclosure, the system processes the exhalate by passing it along an exhalate airflow path. The exhalate airflow path is arranged to convey breath from the user to the filter unit. The filter unit may filter the exhalate.

The system may be formed in a number of ways to enable the inhalate to be effectively delivered to a user while also enabling the exhalate to be effectively processed within the system. Examples are disclosed herein of such a system. The processing of the exhalate may include removal of aerosol droplets from the vapor. In this way, a user may be able to use the system to inhale aerosol in locations where exhalation into the environment of an aerosol is undesirable which may be a variety of reasons. During exhalation, the user can exhale into the system rather than into the environment. Such a system can operate as a personal exhalate air filter.

The present system may advantageously avoid blowing back through an aerosol forming material in the system so as to reduce the rate at which the aerosol forming material is degraded. The present system also advantageously avoids adding excessive flow restriction during exhalation.

In an example, the inhalate airflow path and the exhalate airflow path are entirely distinct from each other. In this way, the system prevents any exhalate being re-inhaled on a subsequent puff. Each inhalation is a new inhalation and does therefore not suffer from inclusion of unintended material. In turn, this improves the user's experience of the system.

In an example, the mouthpiece forms both a portion of the inhalate airflow path and a portion of the exhalate airflow path, and is configured to move between an inhalation position and an exhalation position, wherein, in the inhalation position, the mouthpiece is in fluid communication with the remainder of the inhalate airflow path and is not in fluid communication with the remainder of the exhalate airflow path, and wherein, in the exhalation position, the mouthpiece is not in fluid communication with the remainder of the inhalate airflow path and is in fluid communication with the remainder of the exhalate airflow path. By re-using a portion of the system for both the inhalate airflow path and the exhalate airflow path, advantageously this enables the system to be more compact and therefore the system can be provided in a greater number of ergonomic conformations. This, in turn, may improve the user's experience of the system.

In an example, the mouthpiece is hinged so as to rotate between the inhalation position and the exhalation position. Use of a hinge may allow the mouthpiece to rotate under either manual or automatic stimulus. A hinge is an option for providing movement in a system with a portion of the inhalate and exhalate airflow path being the same. Use of a hinge enables the system to use space which may otherwise not be used for components of the system. In this way, the hinge may allow the system to be designed in a greater number of ways, which in turn may allow for more compact designs. This may allow for a greater number of ergonomic conformations. This, in turn, may improve the user's experience of the system.

In an example, the mouthpiece is rotatable to move between the inhalation position and the exhalation position. Rotation of the mouthpiece may occur under either manual or automatic stimulus. A rotating mouthpiece is an option for providing movement in a system with a portion of the inhalate and exhalate airflow path being the same. Use of a rotating mouthpiece enables the system to use space which may otherwise not be used for components of the system. In this way, the rotating mouthpiece may allow the system to be designed in a greater number of ways, which in turn may allow for more compact designs. This may allow for a greater number of ergonomic conformations. This, in turn, may improve the user's experience of the system.

In an example, the mouthpiece has an inlet port which, in the inhalation position, is in fluid communication with the remainder of the inhalate airflow path and is not in fluid communication with the remainder of the exhalate airflow path, and an outlet port which, in the exhalation position, is not in fluid communication with the remainder of the inhalate airflow path and is in fluid communication with the remainder of the exhalate airflow path. This arrangement of an inlet port in an inhalation position and an outlet port in an exhalation position is an option for providing separation between the inhalate airflow path and the exhalate airflow path. This arrangement prevents any exhalate being reinhaled on a subsequent puff due to the separation of the two airflow paths. Each inhalation is a new inhalation and does therefore not suffer from inclusion of unintended particles. In turn, this improves the user's experience of the system.

In an example, the inlet port and the outlet port are the same. Re-using an element in the system is an option for reducing the number of components in the system. In this way, there may be fewer components which may malfunction and, in turn, the system may have a longer lifetime.

In an example, the inlet port and the outlet port are distinct from each other. Ensuring the full inhalate airflow path is separate from the exhalate airflow path allows prevention of condensation of exhalate onto any portion of the inhalate airflow path. In this way, re-inhalation of condensed components from the exhalate is prevented. This in turn allows greater control for the system over the components inhaled by a user.

In an example, the mouthpiece is spring loaded to move between the inhalation position and the exhalation position. Use of a spring loaded mouthpiece allows for the mouthpiece to be biased into one position over another. In an example therefore, the mouthpiece may be biased into the inhalation position to enable the user to inhale while in the "resting" position. During exhalation therefore, the user would work against the spring loaded mouthpiece to move into the exhalation position. In this way, the system would be prepared and ready for use in the default position thereby increasing the user experience of the system. In another example, the mouthpiece may be biased into the exhalation position such that the user is required to move the mouthpiece to the inhalation position but the system when reverts to receiving exhalate from the user. In this way, the user is encouraged to use the exhalate-receiving function provided by the system.

In an example, the non-combustible aerosol delivery system further comprises a diverter assembly, wherein the diverter assembly comprises a multi-flap valve, wherein the flaps of the multi-flap valve have a thickness of no greater than 0.7 mm. In an example, the flaps of the multi-flap valve have a thickness of no greater than 0.5 mm. In an example, the flaps of the multi-flap valve have a thickness of no greater than 0.3 mm. In another example, the flaps of the multi-flap valve have a thickness of no greater than 0.1 mm.

In an example, the filter unit contains at least one filter. The filter unit be arranged to remove aerosol droplets from the vapor. In particular, a filter may be used which comprises glass fiber, polypropylene and combinations thereof which is effective at capturing exhalate. A balance is to be struck between the filtering (exhalate capture) provided by the filter used in the system and the pressure drop during exhalation experienced by a user. Proposed embodiments herein provide a balanced system for capturing exhalate while simultaneously providing a smooth inhale and exhale action for a user. As particles contact filter fibers they are collected and do not re-enter the vapor and are therefore effective filters.

In an example, the filter unit further comprises a separator for separating aerosol droplets from vapor. The separator is a preferred component for removal of aerosol droplets from a vapor as the removal is reasonable while the impact on pressure during exhalation for the user is also reasonable.

In an example, the filter unit comprises at least one deodorizing filter. Advantageously, the deodorizing filter allows for removal of undesirable odor from exhaled vapor. This can therefore improve the user's experience of the system.

In an example, the non-combustible aerosol delivery system further comprises a unit containing a vapor forming material. The unit may be more easily removed from and returned to the system than vapor forming material alone. The user interacts with the unit rather than the vapor forming material which is a simpler and cleaner process. In turn, this therefore improves the user's experience of the system.

In an example, the filter unit and the unit containing the vapor forming material together form a single assembly which is removable from the non-combustible aerosol delivery system. In such an arrangement, the manufacturer may be able to control the amount of vapor forming material provided per filter unit and filter in the filter unit such that the amount of vapor forming material would be sufficient to provide an amount of vapor that would, under most usage patterns, be sufficient to saturate or otherwise use up the filter. In such a way, the lifetime of the vapor forming material and the filter may be matched or balanced so that, when the vapor forming material is used up, so too is the filter, the single assembly can be removed and replaced with a new single assembly. This improves the ease of use of the device and therefore improves the user's experience of the system.

In an example, the non-combustible aerosol provision system is an electronic cigarette. In an example, the non-combustible aerosol provision system is an aerosol generating material heating system.

In an example, the non-combustible aerosol provision system generates aerosol using a combination of aerosol-generating materials, one or a plurality of which may be heated. Use of a plurality of aerosol-generating materials enables the system to provide a flexible and measured aerosol to the user. Greater control over the options available allows a user to control the aerosol produced to that of a bespoke aerosol tailored to the user's preferences. In this way, the user experience of the system is improved.

Further aspects are provided in accordance with the claims.

It is to be understood that both the foregoing general summary of the disclosure and the following detailed description are exemplary, but are not restrictive, of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
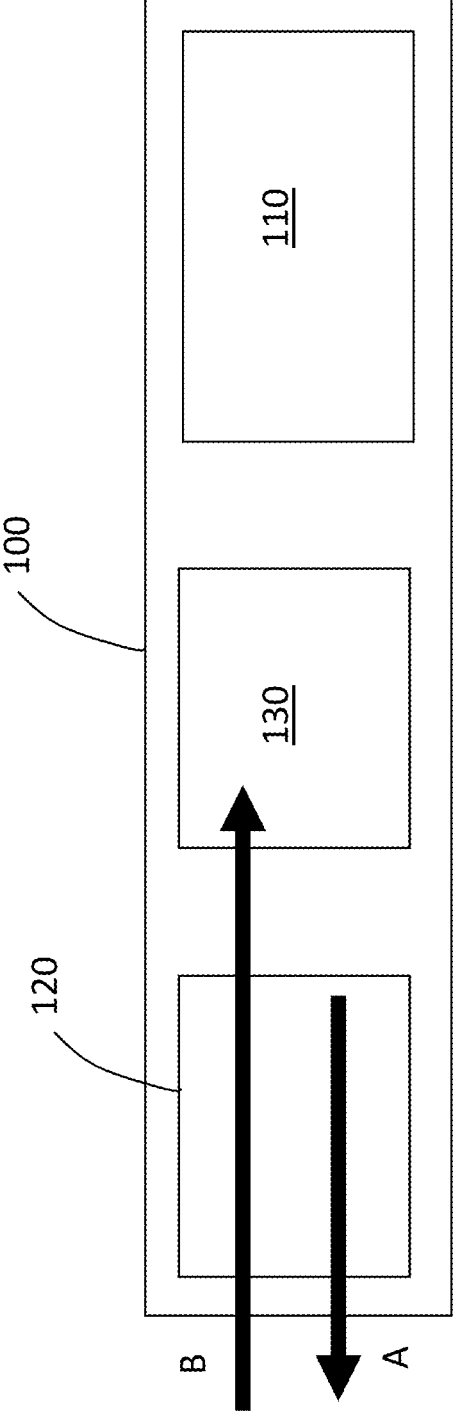
FIG. 1 schematically shows a longitudinal cross-sectional view of an example of a non-combustible aerosol delivery system.

A non-combustible aerosol delivery system and filter unit are disclosed. In the following description, a number of specific details are presented in order to provide a thorough understanding of the embodiments of the present disclosure. It will be apparent, however, to a person skilled in the art that these specific details need not be employed to practice embodiments of the present disclosure. Conversely, specific details known to the person skilled in the art are omitted for the purposes of clarity where appropriate.

As described above, the present disclosure relates to a non-combustible aerosol delivery which may include an electronic aerosol delivery system or a vapor delivery device such as an e-cigarette or nebulizer. Throughout the following description the term "e-cigarette" is sometimes used but this term may be used interchangeably with (electronic) aerosol/vapor delivery system. Similarly, the terms "vapor' and 'aerosol' are referred to equivalently herein.

Generally, the non-combustible aerosol delivery device may be an electronic cigarette, also known as a vaping device or electronic nicotine delivery system, although it is noted that the presence of nicotine in the aerosolizable material is not a requirement. In some embodiments, a non-combustible aerosol delivery device is a tobacco heating system, also known as a heat-not-burn system. In some embodiments, the non-combustible aerosol delivery device is a hybrid system to generate aerosol using a combination of aerosolizable materials, one or a plurality of which may be heated. Each of the aerosolizable materials may be, for example, in the form of a solid, liquid or gel and may or may not contain nicotine. In some embodiments, the hybrid system comprises a liquid or gel aerosolizable material and a solid aerosolizable material. The solid aerosolizable material may comprise, for example, a tobacco or a non-tobacco product. Meanwhile in some embodiments, the non-combustible aerosol delivery device generates a vapor or aerosol from one or more such aerosolizable materials.

Typically, the aerosol delivery system may comprise a non-combustible aerosol delivery device and an article for use with the non-combustible aerosol delivery device. However, it is envisaged that articles which themselves comprise a means for powering an aerosol generating component may themselves form the non-combustible aerosol delivery device.

In some embodiments, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception. The aerosol forming material may comprise one or more of glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate. The one or more functional materials may comprise one or more of flavors, carriers, pH regulators, stabilizers, and/or antioxidants.

Referring now to the figures, wherein like reference numerals designate identical or corresponding parts throughout the several views, FIG. 1 is a schematic diagram of non-combustible aerosol delivery system 100. The non-combustible aerosol delivery system 100 is arranged for filtering exhaled breath. The non-combustible aerosol delivery system 100 has a power source 110, a mouthpiece 120 and a filter unit 130. The non-combustible aerosol delivery system 100 has an inhalate airflow path A adapted to convey vapor generated by the aerosol delivery system 100 to the user during an inhalation. The non-combustible aerosol delivery system 100 has an exhalate airflow path B, adapted to convey breath from the user to the filter unit 130 during an exhalation into the aerosol delivery system 100. In the schematic example of FIG. 1, A and B are shown as passing in opposite directions through the mouthpiece 120.

The system 100 is arranged to pass breath from the user through the filter unit 120. The filter unit 120 is arranged to collect the vapor passing through the system 100 in the breath exhaled by a user. In this way, the user may optionally exhale through the system 100 when desiring to not exhale vapor. This may be particularly advantageous in areas of close proximity to others or in areas where vapor production is not allowed or discouraged.

The user, therefore, is able to use the system 100 as a way to capture exhalate and not produce a visible exhalation.

Figure 2:
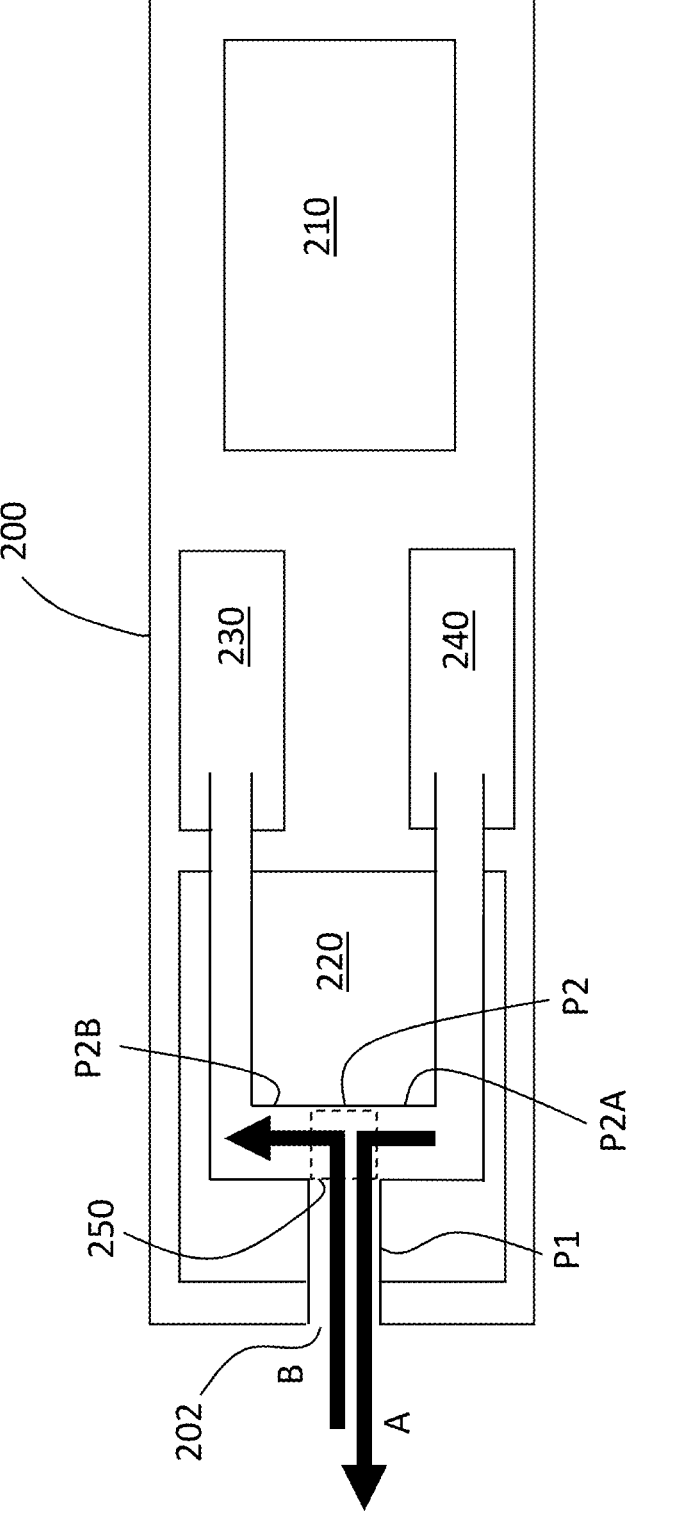
FIG. 2 schematically shows a longitudinal cross-sectional view of an example of a non-combustible aerosol delivery system.

Referring now to FIG. 2, there is shown a schematic diagram of a non-combustible aerosol delivery system 200. The non-combustible aerosol delivery system 200 of FIG. 2 has a power source 210, a mouthpiece 220 and a filter unit 230. The non-combustible aerosol delivery system 200 has inhalate airflow path A and exhalate airflow path B. The non-combustible aerosol delivery system 200 has an outlet 202 through which inhalate airflow path A and exhalate airflow path B pass.

In the example of FIG. 2, a portion of the inhalate airflow path A and a portion of the exhalate airflow path B are the same. Utilizing the same path for a portion P1 of the inhalate and exhalate airflow paths A, B allows the option of using one outlet 202 in the system 200. In this way, the reduction of number of components in the system 200 increases the overall lifetime of the system 200. Similarly, a shared portion P1 allows for more compact conformations of the system 200, which can lead to an improved user experience with the system 200.

The inhalate airflow path A and exhalate airflow path B are shown. Both paths A, B enter a pathway P1 which branches at P2. Inhalate airflow path A enters pathway P1 from branch P2A. Exhalate airflow path B exits pathway P1 into branch P2B. In this way, the two airflow paths A, B share portion P1 of the pathway P1, P2.

Inhalate airflow path A is shown as coming from an aerosol generating component 240 to an outlet 202 of the mouthpiece 220. Exhalate airflow path B is shown as going to a filter unit 230 from the outlet 202 of the mouthpiece 220. The aerosol generating component 240 may include a heater and aerosolizable material arrangement so that, in use, a vapor is produced for inhalation.

The system 200 has a diverter assembly 250 shown in dotted lines. Such a diverter assembly 250 may be arranged to allow, during inhalation, passage of the inhalate airflow from passage portion P2A to passage portion P1 and prevent, during inhalation, any airflow from passage portion P1 to passage portion P2B. The diverter assembly may be arranged to allow, during exhalation, passage of the exhalate airflow from passage portion P1 to passage portion P2B during exhalation and prevent, during exhalation, any airflow from passage portion P2A to passage portion P1. In this way, the system 200 provides for a controlled passage of exhalate airflow to the filter for processing while avoiding the exhalate interacting with, and depleting, the aerosol generating material in aerosol generating component 240. The diverter assembly 250 may be a multi-flap valve, wherein the flaps of the multi-flap valve have a thickness of no greater than 0.7 mm. A multi-flap valve may be a system which has at least two flaps, one for moving to enable movement of air for inhalation and blocking exhalation and one for moving to enable movement of air for exhalation and blocking inhalation.

Figure 3:
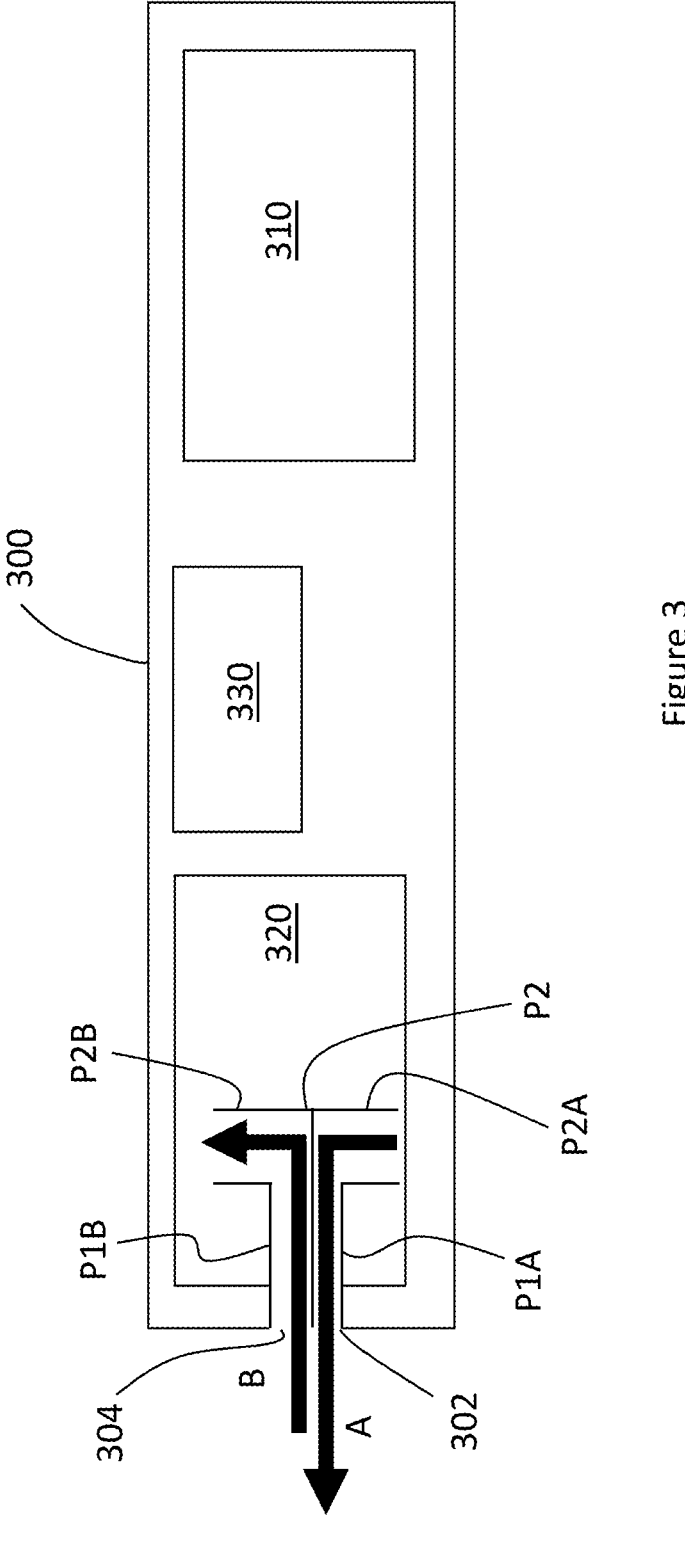
FIG. 3 schematically shows a longitudinal cross-sectional view of an example of a non-combustible aerosol delivery system.

Referring now to FIG. 3, there is shown a schematic diagram of a non-combustible aerosol delivery system 300. The non-combustible aerosol delivery system 300 of FIG. 3 has a power source 310, a mouthpiece 320 and a filter unit 330. The non-combustible aerosol delivery system 300 has inhalate airflow path A and exhalate airflow path B. The non-combustible aerosol delivery system 300 has an outlet 302 through which inhalate airflow path A may pass and an inlet 304 through which exhalate airflow path B may pass.

The arrangement of FIG. 3 is similar to that of FIG. 2, however, the shared passage portion P1 of FIG. 2 has been split into a separate inhalation airflow passage portion P1A and an exhalation airflow passage portion P1B.

Inhalation airflow path A travels along inhalation airflow passage portion P1A to the outlet 302. Though not shown, the inhalation airflow path A may begin at an aerosol generating component or the like and travel along passage portion P2A to reach passage portion P1A.

Exhalation airflow path B enters exhalation airflow passage portion P1B at the inlet 304. The exhalation airflow path B passes along exhalation airflow passage portion P1B and then along passage portion P2B. Though not shown in FIG. 3, the passage portion P2B may carry the exhalate through the mouthpiece 320 to the filter unit 330 for processing (as in FIG. 2).

In this example, therefore, the inhalate airflow path A and the exhalate airflow path B are entirely distinct from each other. There is therefore no need for the additional diverter assembly element as shown in FIG. 2. In this way, the system 300 prevents any exhalate being re-inhaled on a subsequent puff. Each inhalation is along a path that the previous exhalation cannot take. Therefore, each inhalation cannot be tainted by accidental inclusion of particles left over (via condensation or otherwise) from the previous exhalation into the system 300. This provides a more repeatable and familiar vapor for inhalation and prevents unintended changes in the vapor composition. In turn, this improves the user's experience of the system.

Figure 4:
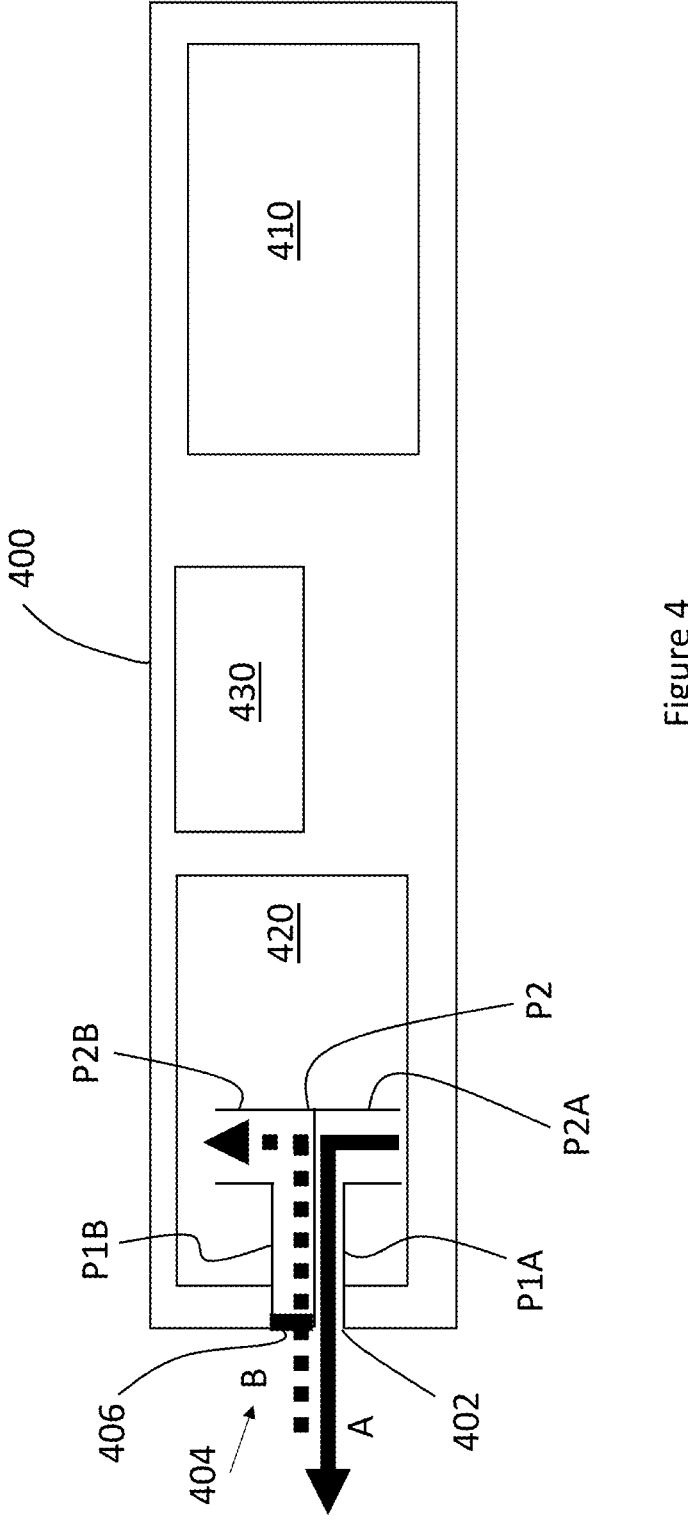
FIG. 4 schematically shows a longitudinal cross-sectional view of an example of a non-combustible aerosol delivery system.

Referring now to FIG. 4, there is shown a schematic diagram of a non-combustible aerosol delivery system 400. The non-combustible aerosol delivery system 400 of FIG. 4 has a power source 410, a mouthpiece 420 and a filter unit 430. The non-combustible aerosol delivery system 400 has inhalate airflow path A and exhalate airflow path B. The non-combustible aerosol delivery system 400 has an outlet 402 through which inhalate airflow path A and an inlet 404 through which exhalate airflow path B may pass. The system 400 also has a movable portion 406.

The system 400 also has a moveable portion 406 which can move so as to block outlet 402 or outlet 404. By moving the movable portion 406 to block the inlet 404 or outlet 402, one of the airflow paths A, B can be prevented. In an example, if the portion separating airflow paths A, B were removed, the outlet 402 and inlet 404 may be combined into one larger inlet/outlet and the movable portion 406 may simply move to block one or the other. In this instance, the inlet 404 through which exhalate may enter the system 400 is blocked by movable portion 406.

In the example shown in FIG. 4, the moveable portion 406 is in a first position, an inhalation position, and therefore provides fluid communication through the device to the outlet 402 for the inhalate airflow path A. The inhalate airflow path A is therefore shown in full lines. In contrast, the movable portion 406 is blocking the inlet 404 for the exhalate airflow path B, which is therefore shown in dashed lines.

Controlling the movement of the moveable portion 406, which may be part of the mouthpiece 420, allows for selection of one of the airflow paths to be operational and prevent the other from operating. In this way, one airflow path can be entirely separated from another. The moveable portion 406 may be triggered by a passive or active measure. The power method can be active or passive. While passive methods have associated cost benefits, automatic can be better for ease of use.

In this way, the system 400 prevents any exhalate being re-inhaled on a subsequent puff. Each inhalation is along a path that the previous exhalation cannot take. Therefore, each inhalation cannot be tainted by accidental inclusion of particles left over (via condensation or otherwise) from the previous exhalation into the system 400. This provides a more repeatable and familiar vapor for inhalation and prevents unintended changes in the vapor composition. In turn, this improves the user's experience of the system.

Figures 5A, 5B:
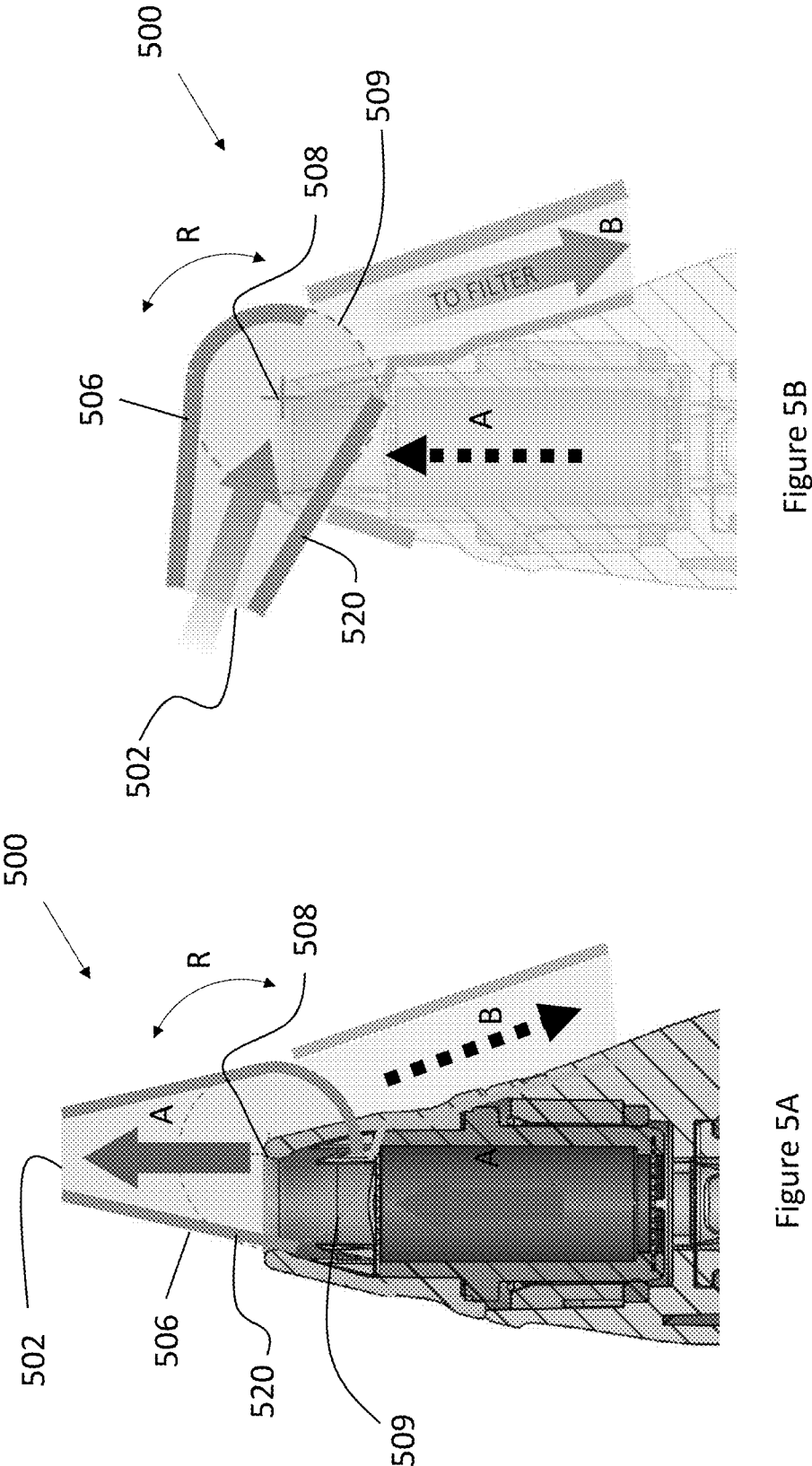
FIG. 5A schematically shows a sectional view of an example of a non-combustible aerosol delivery system.
FIG. 5B schematically shows a sectional view of an example of a non-combustible aerosol delivery system.

Referring now to FIGS. 5A and 5B, there are shown sectional views of a non-combustible aerosol delivery system 500. Although not shown, the non-combustible aerosol delivery system 500 has similar features to the previous examples of FIGS. 2 to 4.

The non-combustible aerosol delivery system 500 of FIG. 5A has inhalate airflow path A and exhalate airflow path B. The non-combustible aerosol delivery system 500 has an outlet 502 through which inhalate airflow path A and exhalate airflow path B may pass. The system 500 also has a movable portion 506 as part of the mouthpiece. The system 500 has a hinge 508. The mouthpiece 520 is hinged by hinge 508 so as to rotate in the direction shown by arrow R between the inhalation position and the exhalation position. The system 500 of FIGS. 5A and 5B have an inlet port/outlet port 509 which, in the inhalation position (FIG. 5A), is in communication with the remainder of the inhalate airflow path A and is not in communication with the remainder of the exhalate airflow path B and vice versa for the exhalation position (FIG. 5B).

The inhalation position is shown in FIG. 5A. The inhalation airflow path A leads from inside the system 500 to the outlet 502 in FIG. 5A. The exhalation airflow path B is shown as prevented in FIG. 5A and is therefore in dashed lines.

The exhalation position is shown in FIG. 5B. The exhalation airflow path B leads from the outlet 502 to the filter of system 500 in FIG. 5B. The inhalation airflow path A is shown as prevented in FIG. 5A and is therefore in dashed lines.

Use of rotation allows for the system 500 to be designed ergonomically, as it utilizes a portion of the mouthpiece 520 for both pathways A, B. In this way, the system 500 may be made more compact and therefore be easier to handle and store for a user.

Figures 6A, 6B:
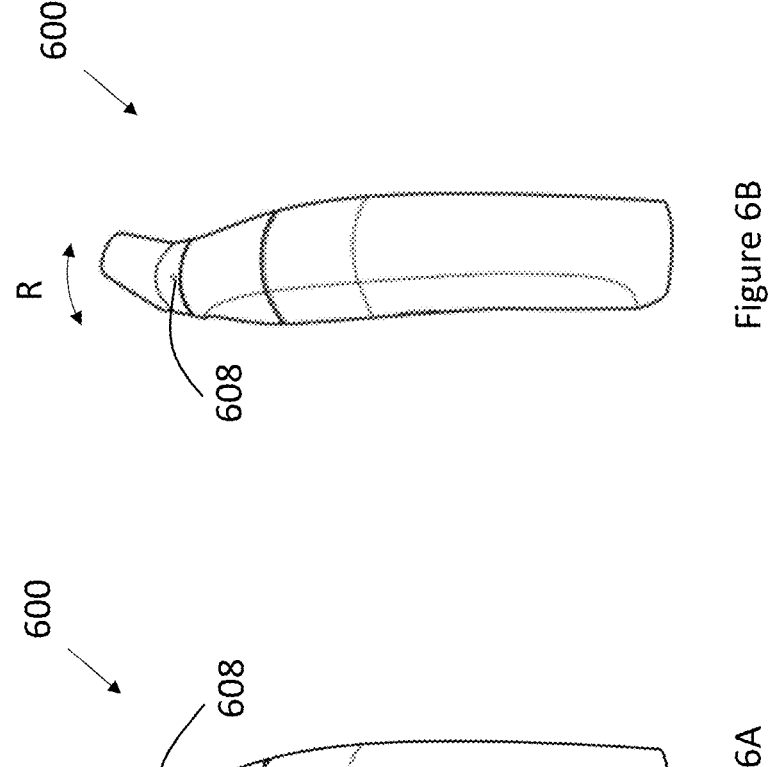
FIG. 6A schematically shows a side-on view of example of a non-combustible aerosol delivery system.
FIG. 6B schematically shows a side-on views of example of a non-combustible aerosol delivery system.

Referring now to FIGS. 6A and 6B, there are shown side-on views of a non-combustible aerosol delivery system 600. Although not shown, the non-combustible aerosol delivery system 600 has similar features to the previous examples of FIGS. 2 to 4.

The system 600 of FIG. 6 has a hinge 608 as in the system 500 of FIGS. 5A and 5B. The hinge 608 allows the mouthpiece to rotate in the direction shown by arrow R between an inhalation position and an exhalation position. This illustrates that the mouthpiece may move in a plurality of directions across different arrangements between the inhalation position and the exhalation position. In the examples of FIGS. 5A, 5B, 6A and 6B the movement is via rotation though this need not be the case. In both these cases, the inlet port 509 and the outlet port 509 is the same.

Figure 7C:
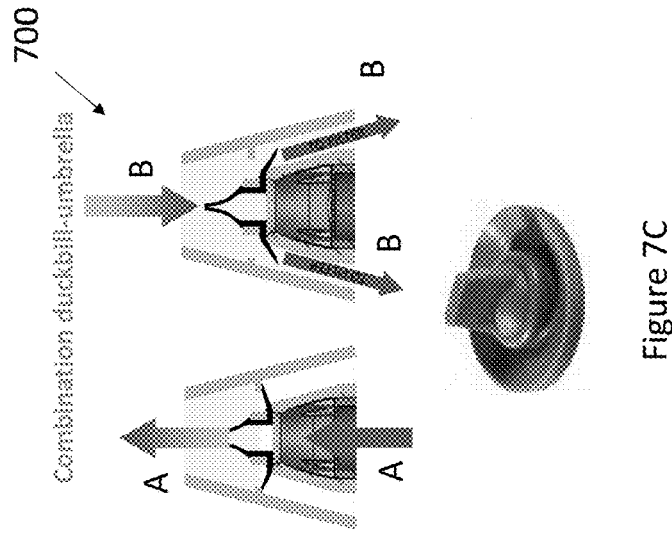
FIG. 7C schematically shows a sectional view of an example of non-combustible aerosol delivery systems alongside filter selections.
Figure 7B:
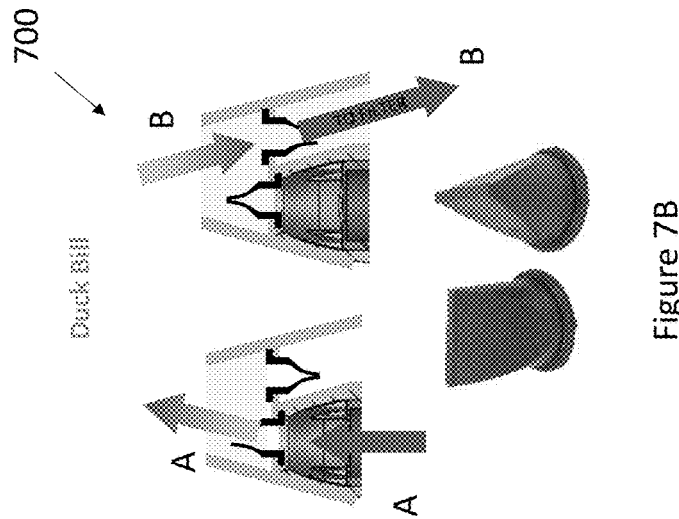
FIG. 7B schematically shows a sectional view of an example of non-combustible aerosol delivery systems alongside filter selections.
Figure 7A:
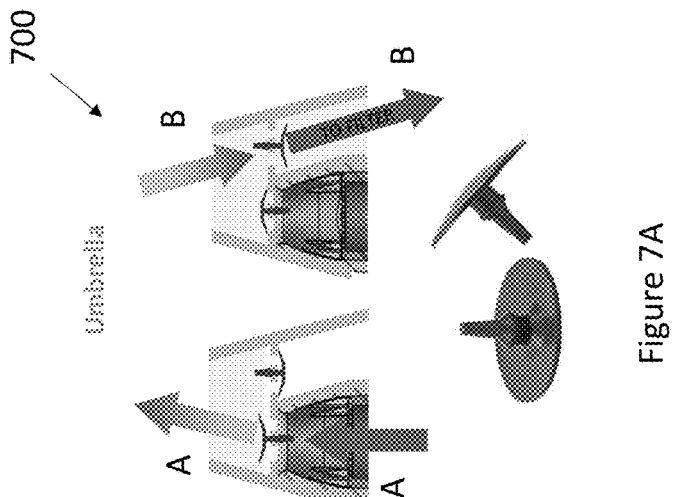
FIG. 7A schematically shows a sectional view of an example of non-combustible aerosol delivery systems alongside filter selections.

Referring now to FIGS. 7A, 7B and 7C, there are shown sectional views of a non-combustible aerosol delivery system 700. Although not shown, the non-combustible aerosol delivery system 600 has similar features to the previous examples of FIGS. 2 to 4.

The system 700 of FIG. 7A has two umbrella valves. One umbrella valve is arranged between the inlet/outlet of the system 700 so as to allow inhalate airflow path A to be complete during inhalation while blocking exhalate airflow path (left hand side of FIG. 7A). The other umbrella valve is arranged between the inlet/outlet of the system 700 so as to allow exhalate airflow path B to be complete during exhalation while blocking inhalate airflow path (right hand side of FIG. 7A). In this way, airflow paths A and B are maintained separately while sharing a portion of the airflow path (mouthpiece outlet area). The airflow paths A, B are therefore partially distinct paths. This has advantages as explained above. The umbrella valves of FIG. 7A are arranged in opposing orientations.

The system 700 of FIG. 7B has two duck bill valves. One duck bill valve is arranged between the inlet/outlet of the system 700 so as to allow inhalate airflow path A to be complete during inhalation while blocking exhalate airflow path (left hand side of FIG. 7B). The other duck bill valve is arranged between the inlet/outlet of the system 700 so as to allow exhalate airflow path B to be complete during exhalation while blocking inhalate airflow path (right hand side of FIG. 7B). In this way, airflow paths A and B are maintained separately while sharing a portion of the airflow path (mouthpiece outlet area). The airflow paths A, B are therefore partially distinct paths. This has advantages as explained above. The duck bill valves of FIG. 7B are arranged in opposing orientations.

The system 700 of FIG. 7C has a combination duckbill-umbrella valve. The duckbill-umbrella valve is arranged between the inlet/outlet of the system 700 so as to allow inhalate airflow path A to be complete, passing through the duckbill portion of the valve, during inhalation while blocking exhalate airflow path. The duckbill-umbrella valve is arranged between the inlet/outlet of the system 700 so as to allow exhalate airflow path B to be complete, passing through the umbrella portion of the valve, during exhalation while blocking inhalate airflow path. In this way, airflow paths A and B are maintained separately while sharing a portion of the airflow path (mouthpiece outlet area). The airflow paths A, B are therefore partially distinct paths. This has advantages as explained above.

In the example shown in FIG. 7C, the duckbill portion of the valve is arranged centrally while the umbrella portion is maintained at the edges of the system 700. Such an arrangement may be advantageous in light of the temperature difference between inhalation and exhalation of the aerosol. The exhalate will be cooler than the inhalate and, therefore, is safer to pass closer to the edge of the system 700, which the user's hand may hold during use.

Figure 8:
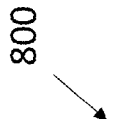
FIG. 8 schematically shows a sectional view of an example of a non-combustible aerosol delivery system.
Figure 8:
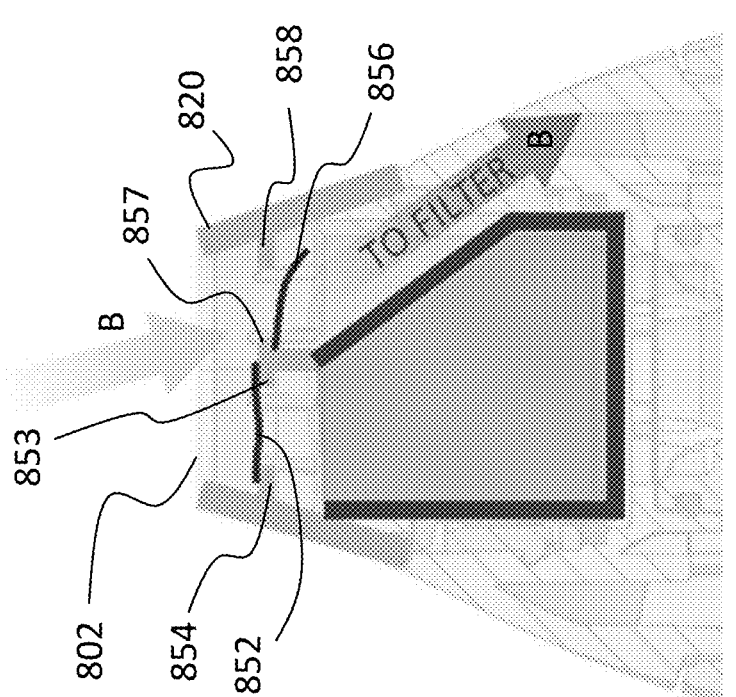

Referring now to FIG. 8, there is shown a sectional view of a non-combustible aerosol delivery system 800. Although not shown, the non-combustible aerosol delivery system 800 has similar features to the previous examples of FIGS. 2 to 4.

The non-combustible aerosol delivery system 800 has an outlet/inlet 802 arranged in the mouthpiece 820 for exhalate and inhalate. The non-combustible aerosol delivery system 800 also has a pair of flappy valves 852, 856. Flappy valve 852 is secured to projection 853 and rests on projection 854. Flappy valve 852 will move away from projection 854 during inhalation from the pressure change in the system 800. Flappy valve 856 is secured to projection 857 and rests on projection 858. During inhalation, flappy valve 856 moves against projection 858 and therefore prevents airflow into or from the exhalation airflow passage B. Conversely, during exhalation, flappy valve 825 prevents airflow into or from the inhalation airflow and allows airflow from the outlet 802 to the filter via airflow path B. The flappy valves 852, 856 are arranged in opposing orientations.

The mouthpiece may therefore move to allow airflow to pass between different passages within the system. In embodiments, a spring loaded mouthpiece is arranged to move between an inhalation position and an exhalation position. Other mechanical elements such as a slider may be used to move the mouthpiece so as to engage one pathway or the other. The mechanical elements such as the slider, or the like, may move the mouthpiece or the valve. Electric valves may be used (e.g., flexible solenoid valves) which may be activated by a button or the like on the system.

Any combination of valves, passages, divertors, spring-loaded or bias mechanisms may be used in the system. Thicknesses of valves have been considered and values of thicknesses 0.1 mm to 0.7 mm, such as 0.1 mm to 0.5 mm, have been found to be particularly effective. These have been found to balance the requirements of valve activation tensile strength and pressure drop. In particular, 0.1 mm flap thicknesses have been found to provide an advantageous pressure drop such that user experience is not impaired during exhalation. The thinner the flap, the less pressure required to move it. Such flaps have in examples demonstrated minor leakage issues and therefore thicker flaps may be advantageous in certain instances. In particular, 0.5 mm flap thickness have shown greater liquid retention and therefore do not exhibit leakage as readily. As such, 0.5 mm may be selected as the valve thickness when liquid loss is particularly undesirable. 0.3 mm thickness is a middle point enabling both good pressure drop and good prevention of leakage.

In examples, an acceptable pressure drop is around 300 pascal (Pa) for a reasonable user experience of the system. As such, a valve thickness may be selected to not affect the pressure drop more than around 300 Pa. Of course, the valve and the filter may both contribute to pressure drop, though not necessarily in a linear manner, and the overall effect can be calculated to be around 300 Pa while providing effective filtering. The examples shown herein provide such an advantageous balance.

Similarly, it is important for valves to provide a good fit around the airflow passage the valve is designed to block. In certain examples herein, the valve is not actuated by air pressure of exhalation or inhalation but rather an external actor, for example a lever, switch, by magnetism or the like. In these instances, the valve may be very thick as the pressure drop on exhalation is not a relevant consideration. Rather it is more important that the valve provide an effective seal during use of the system.

Figure 9:
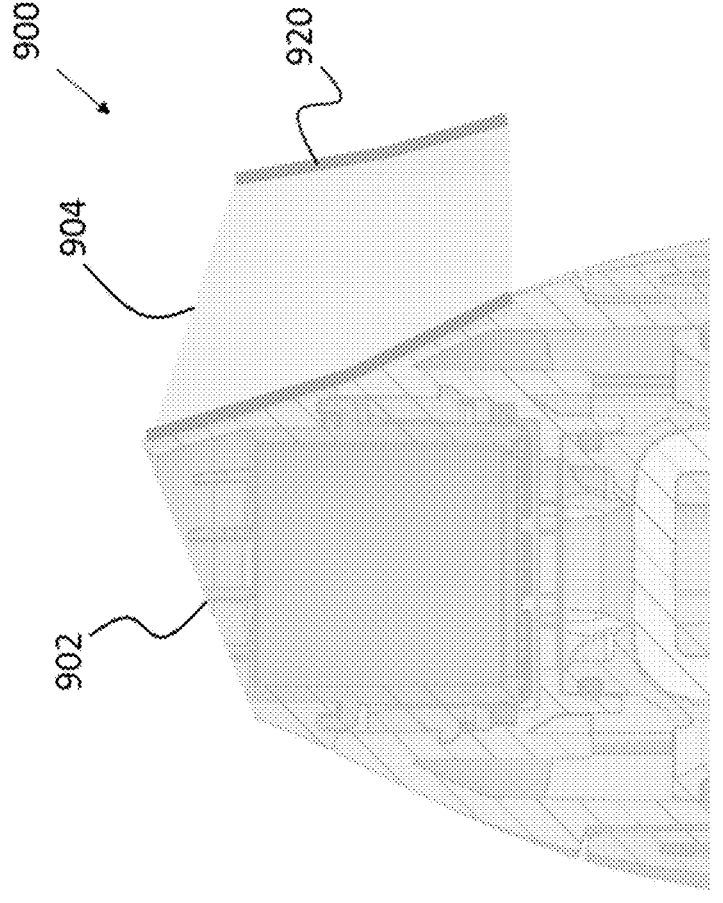
FIG. 9 schematically shows a sectional view of an example of a non-combustible aerosol delivery system.

Referring now to FIG. 9, there is shown a sectional view of a non-combustible aerosol delivery system 900. Although not shown, the non-combustible aerosol delivery system 900 has similar features to the previous examples of FIGS. 2 to 4.

The non-combustible aerosol delivery system 900 has an outlet 902 through which inhalate may pass from the system 900 to a user. The non-combustible aerosol delivery system 900 also has an inlet 904 through which exhalate may pass into the system 900 from the user and pass to a filter for processing. In this way, another example is provided using multiple separate inlets/outlets.

Now referring to FIGS. 10 to 19, there are shown sectional views of a series of examples of non-combustible aerosol delivery systems 1000-1900. Each of these has an outlet as with previous examples and the airflow paths within the systems are controlled in some manner. These will be briefly outlined below. Although not shown, the systems shown have similar features to the previous examples of FIGS. 2 to 4.

Figure 10:
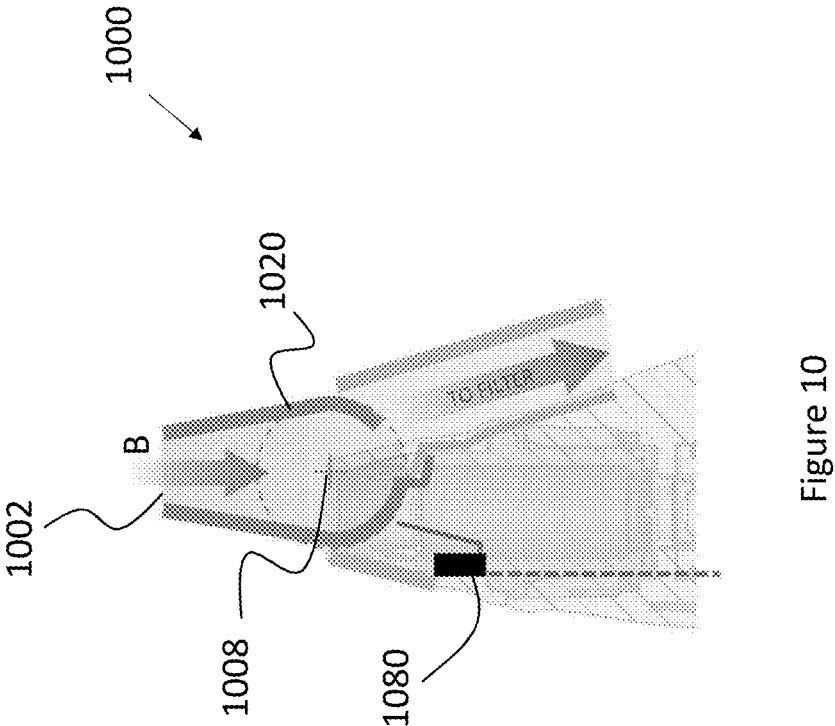
FIG. 10 schematically shows a sectional view of an example of a non-combustible aerosol delivery system.

In FIG. 10, the system 1000 has an outlet 1002 in a mouthpiece 1020 into which exhalate airflow path B can enter and pass to the filter. The system 1000 has a button activator 1080 which may move the mouthpiece 1020 around the movement activator in this case a hinge 1008 to move between an inhalation position and an exhalation position.

Figure 11:
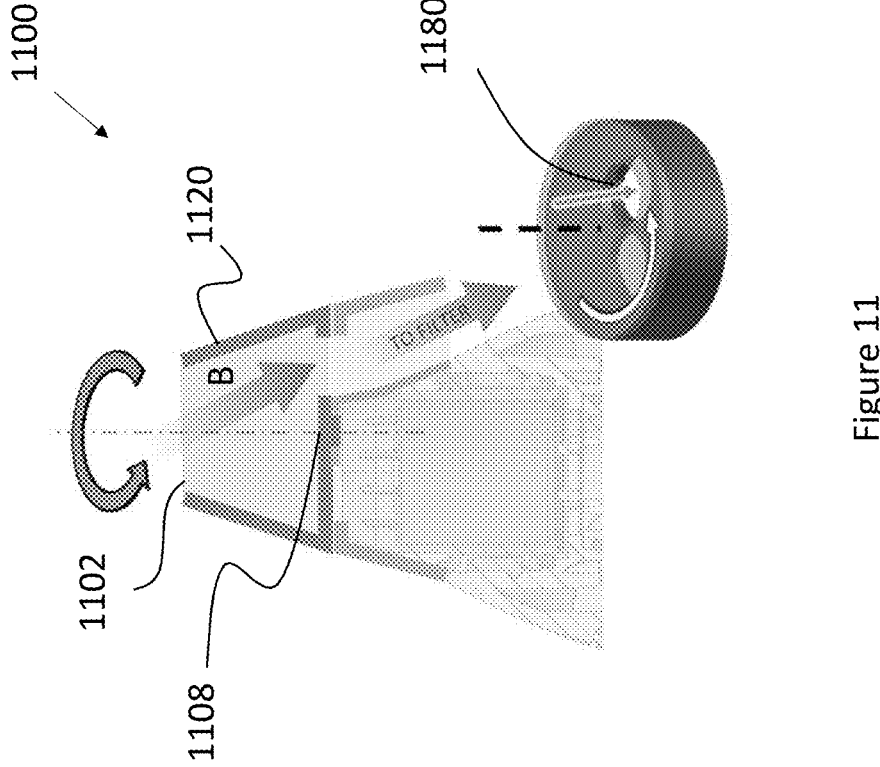
FIG. 11 schematically shows a sectional view of an example of a non-combustible aerosol delivery system.

In FIG. 11, the system 1100 has an outlet 1102 in a mouthpiece 1120 into which exhalate airflow path B can enter and pass to the filter. The system 1100 has a mouthpiece 1120 which can be rotated or twisted by a user to open and close the valve 1180 which may move the mouthpiece 1120 around the axis of rotation shown by 1108 to move between an inhalation position and an exhalation position.

Figure 12:
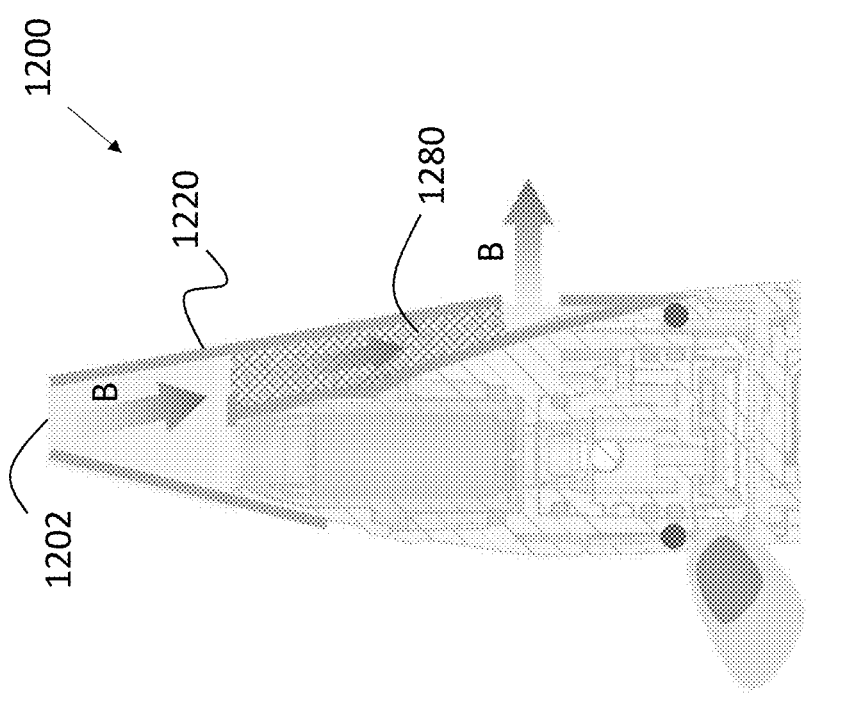
FIG. 12 schematically shows a sectional view of an example of a non-combustible aerosol delivery system.

In FIG. 12, the system 1200 has an outlet 1202 in a mouthpiece 1220 into which exhalate airflow path B can enter and pass to the filter 1280. The system 1200 has a mouthpiece 1220 with a separated path for airflow path B into a portion containing a filter 1280. Filter is contained within the exhalate pathway section.

Figure 13:
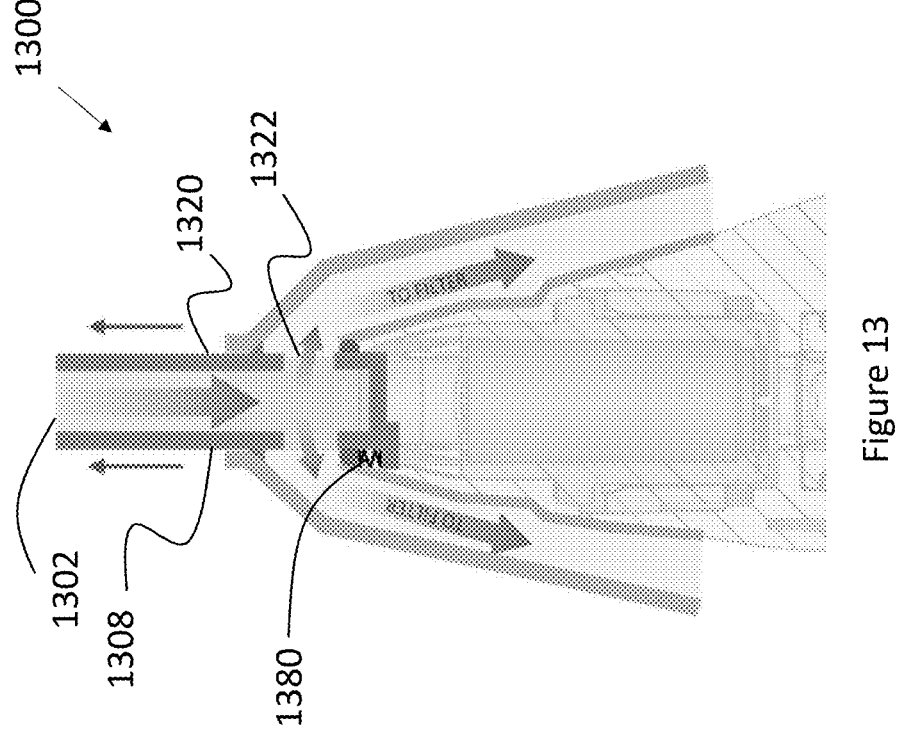
FIG. 13 schematically shows a sectional view of an example of a non-combustible aerosol delivery system FIG. 14 schematically shows a sectional view of an example of a non-combustible aerosol delivery system.

In FIG. 13, the system 1300 has an outlet 1302 in a mouthpiece 1320 into which exhalate airflow path B can enter and pass to the filter. The system 1300 has a mouthpiece 1320 which can be pushed down by a user move opening 1322 in the portion of the mouthpiece in the system 1300. By pushing down the user pushes against spring system 1380. The user exhales and pushes down so as to provide fluid communication between the outlet 1302 and the exhalate flow path B to the filter.

Figure 14B:
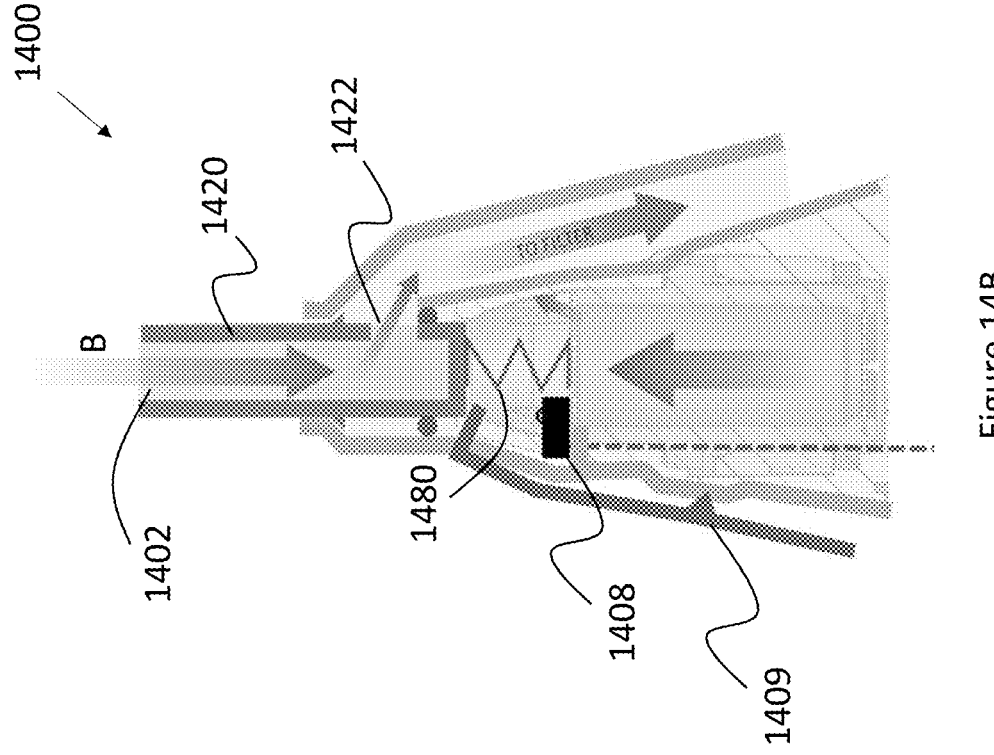
Figure 14A:
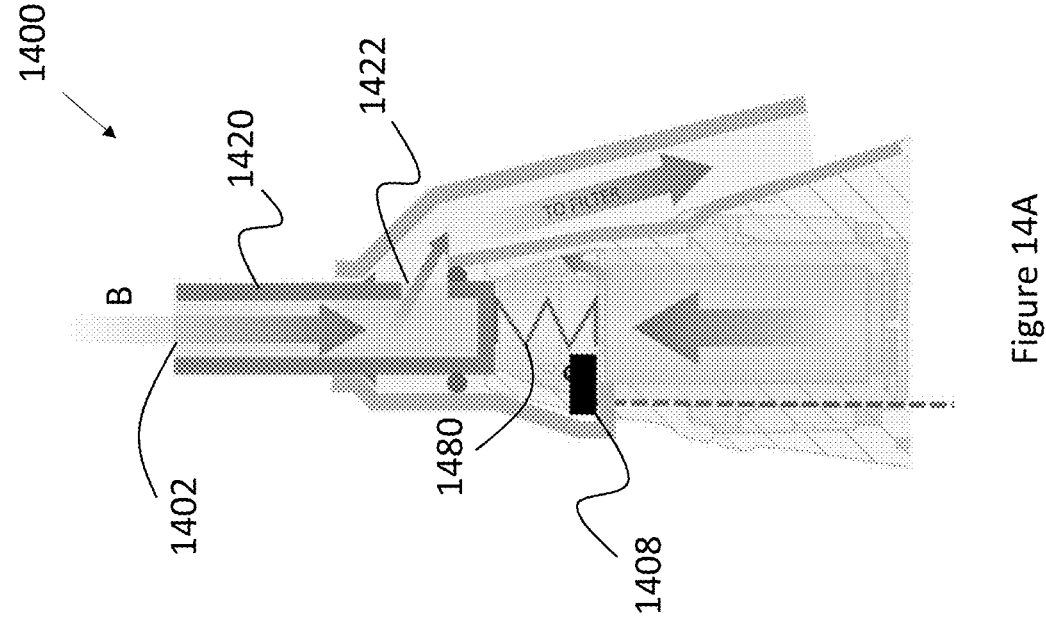

In FIGS. 14A and 14B, the system 1400 has an outlet 1402 in a mouthpiece 1420 into which exhalate airflow path B can enter and pass to the filter. The system 1400 has a mouthpiece 1420 which can be pushed down by a user against spring system 1480 to engage opening 1422 with the exhalate airflow path. The spring system 1480 can also be actuated by button 1408 or lever 1409. The user exhales and pushes down so as to provide fluid communication between the outlet 1402 and the exhalate flow path B to the filter.

Figure 15:
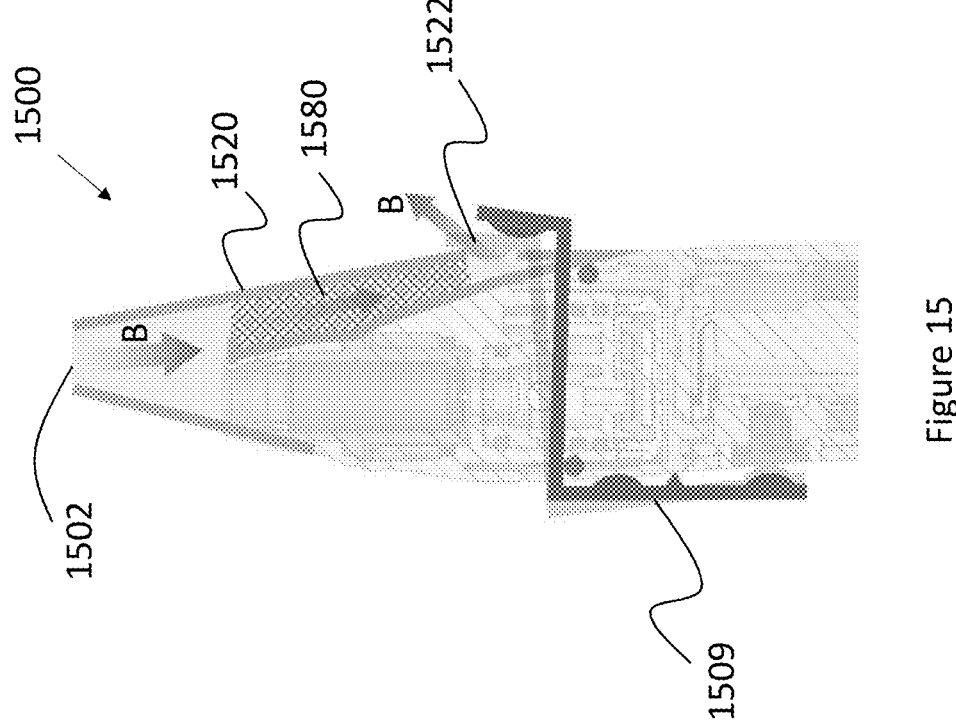
FIG. 15 schematically shows a sectional view of an example of a non-combustible aerosol delivery system.

In FIG. 15, the system 1500 has an outlet 1502 in a mouthpiece 1520 into which exhalate airflow path B can enter and pass to the filter 1580. The system 1500 has a mouthpiece 1520 with a separated path for airflow path B into a portion containing a filter 1580. Filter 1580 is contained within the exhalate pathway section. A lever, button or switch or the like 1509 can be activated to open opening 1522 to open and close the exhalate airflow pathway B.

Figure 16:
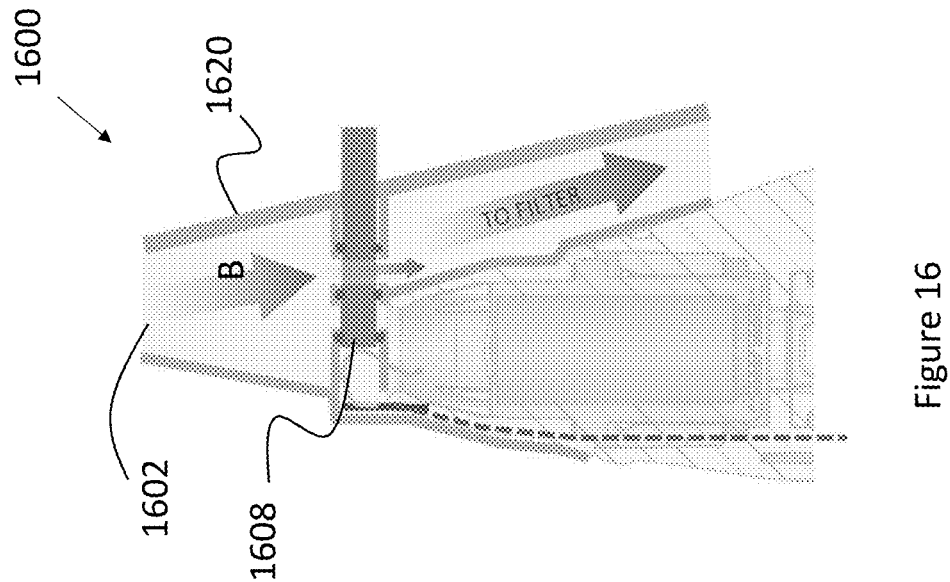
FIG. 16 schematically shows a sectional view of an example of a non-combustible aerosol delivery system.

In FIG. 16, the system 1600 has an outlet 1602 in a mouthpiece 1620 into which exhalate airflow path B can enter and pass to the filter. The system 1600 has a bar 1608 which can be moved between an inhalation and an exhalation position. The bar 1608 may be moved by a manual or electronic switch or the like. The bar 1608 may be moved directly by the user.

Figure 17:
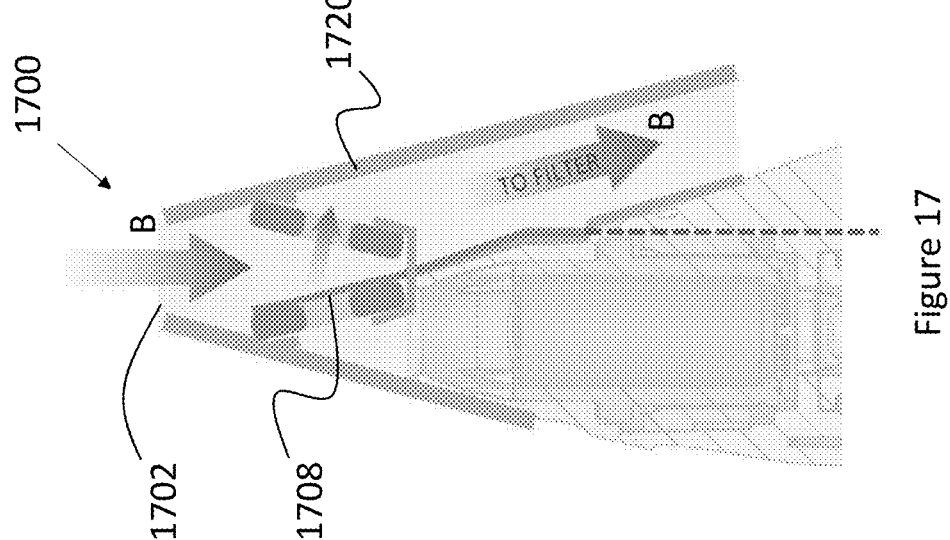
FIG. 17 schematically shows a sectional view of an example of a non-combustible aerosol delivery system.

In FIG. 17, the system 1700 has an outlet 1702 in a mouthpiece 1720 into which exhalate airflow path B can enter and pass to the filter. The system 1700 has a magnetic opening arrangement 1708 which can be moved between an inhalation and an exhalation position. When in the inhalation position, the magnetic opening arrangement 1708 opens in the inhalate airflow pathway and closes the exhalate airflow pathway. Conversely, when in the exhalation position, the magnetic opening arrangement 1708 opens the exhalate airflow pathway and closes the inhalate airflow pathway. The magnetic opening arrangement 1708 may be moved by a manual or electronic switch or the like. The magnetic opening arrangement 1708 may involve a solenoid valve or a flexible solenoid valve.

Figure 18:
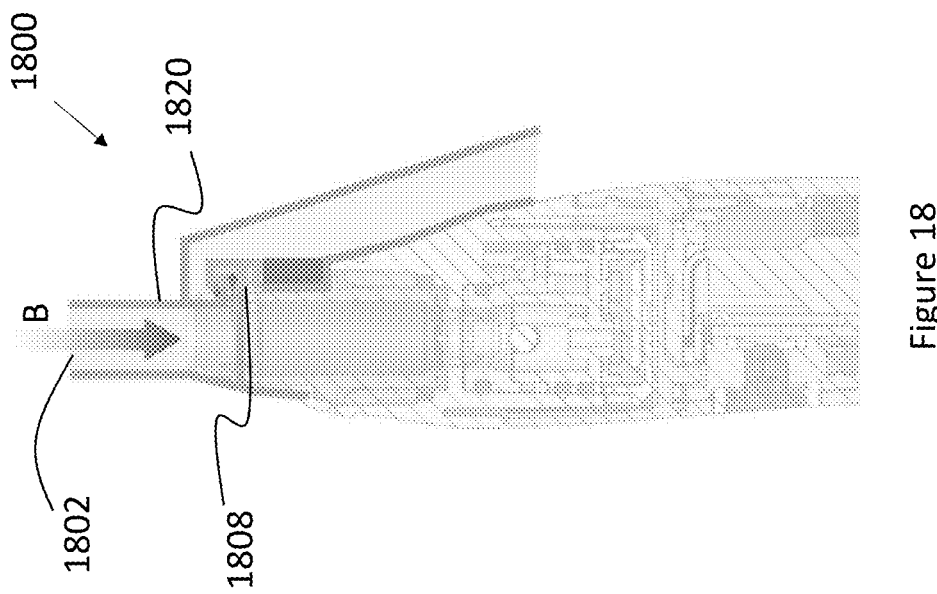
FIG. 18 schematically shows a sectional view of an example of a non-combustible aerosol delivery system.

In FIG. 18, the system 1800 has an outlet 1802 in a mouthpiece 1820 into which exhalate airflow path B can enter and pass to the filter. The system 1800 has a blocking element 1808 which can be moved vertically. The vertical movement allows movement of the blocking element 1808 between an inhalation and an exhalation position. When in the inhalation position, the blocking element 1808 opens in the inhalate airflow pathway and closes the exhalate airflow pathway. Conversely, when in the exhalation position, the blocking element 1808 opens the exhalate airflow pathway and closes the inhalate airflow pathway. The blocking element 1808 may be a 3-way activated valve. The blocking element 1808 may be moved by a manual or electronic switch or the like.

Figure 19:
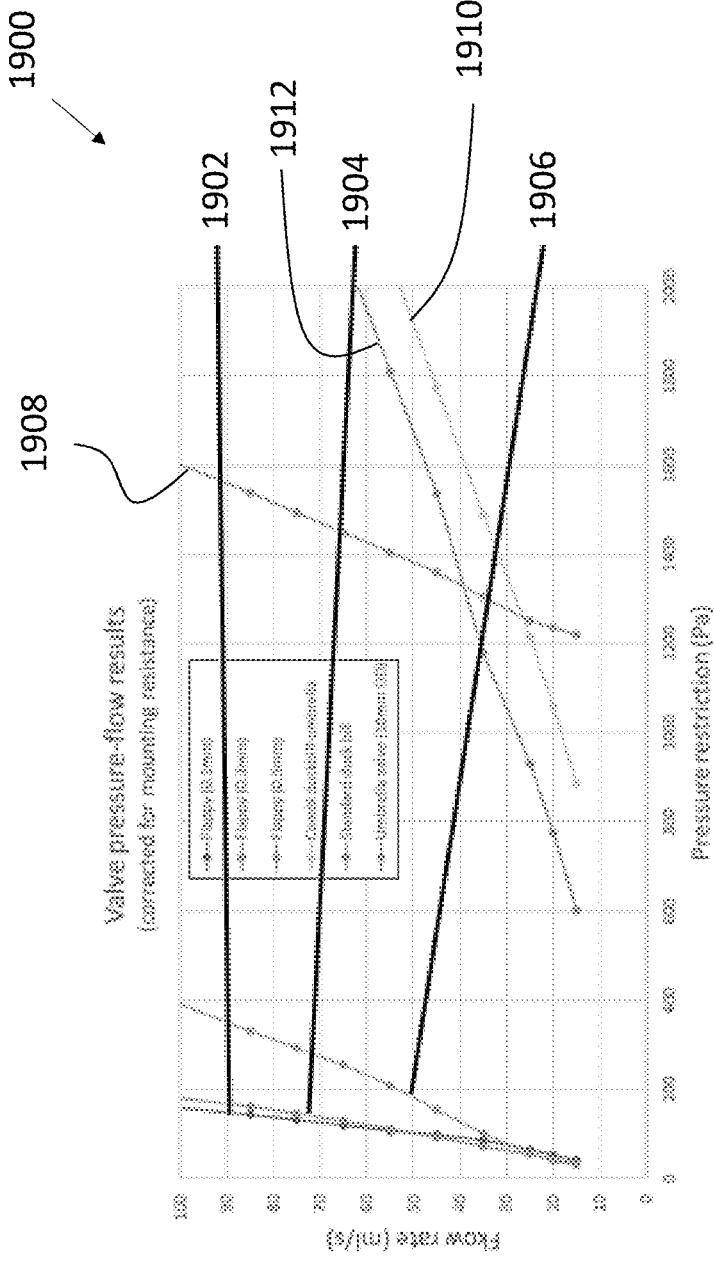
FIG. 19 shows a graph of pressure in Pascals against flow rate in ml/s for three valve types.

In examples, flappy valves, umbrella valves, duck bill valves, combination duckbill-umbrella valves, and any combinations thereof have been used or may be used. The valves do not have identical performance and therefore may be selectively chosen based on the desired performance in the system being constructed. FIG. 19 shows a graph 1900 of pressure in Pascal against flow rate in ml/s. There are 6 graph lines shown, 1902, 1904, 1906, 1908, 1910, 1912. The performance of flappy valves of three different thicknesses are shown: 0.1 mm in line 1902; 0.3 mm in line 1904; and, 0.5 mm in line 1906. The performance of an umbrella valve can be seen in line 1908, the performance of a duckbill valve can be seen in line 1910, and the performance of a combination duckbill-umbrella valve can be seen in line 1912.

It can be seen that the flappy valves have an improved performance in terms of higher flow rate for same pressure restriction in comparison to the umbrella and duckbill valves. It can also be seen that the umbrella valve has an improved performance over the duckbill and combination valve.

Figure 20:
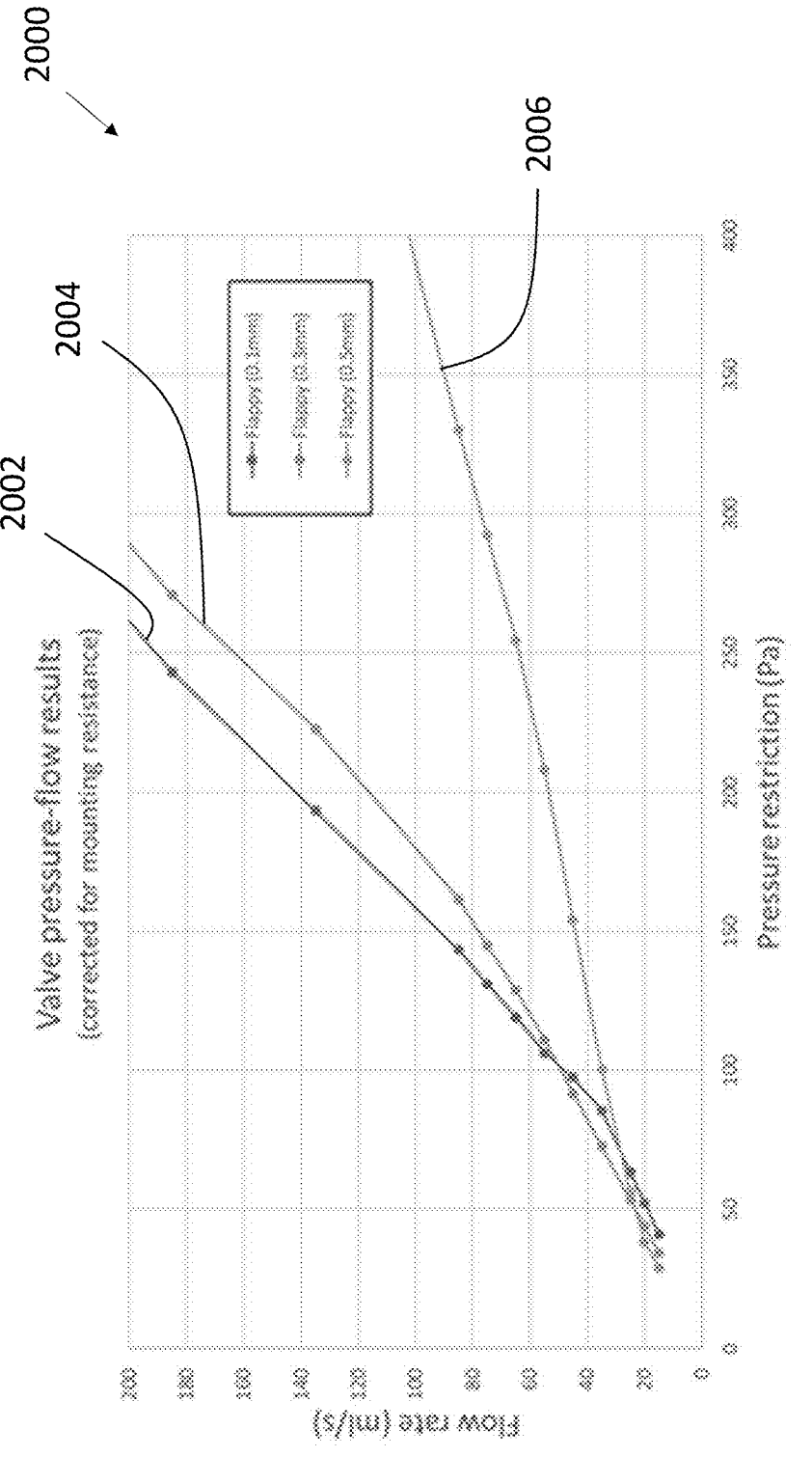
FIG. 20 shows a portion of the graph of FIG. 19.

FIG. 20 shows a portion 2000 of the graph 1900 of FIG. 19. The graph portion 2000 shows the three lines 2002, 2004, 2006 corresponding to the flappy valve thicknesses of 0.1 mm, 0.3 mm, 0.5 mm. The performances of the 0.1 mm and the 0.3 mm flappy valves can be seen as better, in terms of flow rate in light of pressure, than the 0.5 mm flappy valve. However, the 0.1 mm and 0.3 mm flappy valves have worse liquid retention characteristics than thicker valves (e.g. 0.5 mm). As such, a range of thicknesses from around 0.1 mm to above 0.5 mm, say around 0.7 mm, can be beneficial for balancing the desirable factors of liquid retention and pressure drop during inhalation.

The filter unit may be arranged to effectively collect vapor from the breath of a user. This may be by use of a filter in the filter unit comprising a material selected from glass fiber. In other examples, the filter unit may have additionally or alternatively a filter which is a high-efficiency particulate air (HEPA) filter. The HEPA filter may be formed from non-woven glass filament sheets of fabric, cellulosic 'paper' sheets or plastic fibers. These may be formed into a high surface area filter through corrugation and the use of a tortuous path. HEPA filters may be made of either micro glass fibers, or polymers, or a mixture of both (a combination can be used to make filters stronger when pleating). Polymers are seen to have a small benefit in electrostatic attraction of particles. In other examples, the filter unit may have additionally or alternatively a filter which comprises a material selected from polypropylene.

Each of these filters have shown to be particularly advantageous at retaining vapor.

The system therefore is able to remove vapor from the breath of a user which is exhaled through exhalate flow path B. Furthermore, the system is able to remove vapor from the exhalate by, for example, use of a separator for separating aerosol droplets from vapor. In a specific example, the filter unit comprises a vortex separator for removing aerosol droplet from vapor. This advantageously combines with the materials for the filter in the filter unit to more efficiently remove vapor from the exhalate flow.

In an example, the system can further comprise a complex flow path separator. The complex flow separator may be part of the filter unit or separate from the filter unit. The complex flow path separator may divert or redirect exhalate flow in the system. In an example, the complex flow path separator elongates the path along which the exhalate flow travels which enables more separation of the aerosol droplets from the vapor. In turn, this enables a more efficient system for receiving and processing an exhalate flow. Reducing pressure drop across the system during the exhalation of a user is advantageous as the user experience a lesser flow restriction. In this way, as the above elements perform the function of the system while reducing the pressure drop, the user experience is improved.

In an example, the filter unit further comprises a water filtration unit. The water filtration unit may comprise water through which exhalate may be passed to filter it. Water filtration works by passing bubbles of vapor through a liquid to impact them, in this case water. This technique is particularly effective as vapor bubbles has a large water-vapor surface area for interaction, but other liquids may be used. This technique may be used alongside others to collect vapor from the exhalate breath of a user.

In an example, the filter unit may comprise at least one deodorizing filter. Advantageously, the deodorizing filter allows for removal of undesirable odor from exhaled vapor. This can therefore improve the user's experience of the system. The at least one deodorizing filter may comprise at least one filter comprising activated carbon. Activated carbon is a particularly effective deodorizing filter.

In an example, the filter unit may comprise at least one filter comprising activated carbon. Activated carbon allows absorption of volatile compounds which may be present in the exhalate. Removing and absorbing these is of particular advantage to prevent the volatile compounds impacting other components of the system. A further advantage relates to the pressure drop experienced with activated carbon, which is similar to types of aerosolizable material that may be used with the present system to generate an aerosol for inhalation by a user. Therefore, the user may experience little or no pressure drop during the exhalation breath. Therefore, in turn, this further improves the user's experience of the system. Activated carbon may be provided in a block or the like which a number of bores through the block for allowing the passage of exhalate.

In examples, systems may have vapor forming material (or aerosol generating material) in a unit. The unit containing the vapor forming material may be arranged within the system disclosed herein as separate to the power source and the filter. In an example, the power source may be arranged at a distal end of the system. The unit containing the vapor forming material may be proximal to and connected to the power source, as the unit may use power so as to form vapor from the vapor forming material, such as use of electrical power to generate a vapor from heating a vapor forming material. The filter unit may be at a proximal end of the system such that the vapor from the unit containing the vapor forming material may pass the vapor to the mouthpiece or outlet near the user for inhalation prior to the user exhaling back into the system. This arrangement may be specifically advantageous for arrangements of airflow and electrical connections.

In an example, the filter unit and the unit containing the vapor forming material together form a single assembly which is removable from the non-combustible aerosol delivery system. In such an arrangement, the manufacturer may be able to control the amount of vapor forming material provided per filter unit and filter in the filter unit such that the amount of vapor forming material would be sufficient to provide an amount of vapor that would, under most usage patterns, be sufficient to saturate or otherwise use up the filter. In such a way, the lifetime of the vapor forming material and the filter may be matched or balanced so that, when the vapor forming material is used up, so too is the filter, the single assembly can be removed and replaced with a new single assembly. This improves the ease of use of the device and therefore improves the user's experience of the system.

Relatedly, this may enable easy removability of one portion of the system (the single assembly) which may need more regular cleaning than e.g., the section of the system containing the power source. As airflow need not pass through the power source, there is less likelihood of regular cleaning being needed at the power source. By enabling cleaning of a portion which requires cleaning more regularly, the overall lifetime of the system is increased.

Furthermore, replacement filters or the like may be inserted into the single assembly as the filter unit ages with use. Again, this will increase the overall lifetime of the system and prevent the full system being thrown away after a filter unit is depleted. The vapor forming material may also be removed from the single assembly and replaced to increase the lifetime of the system.

Alternatively, the single assembly may be used and discarded, after use, for replacement with another single assembly. This arrangement would prevent a user needing to contact vapor forming material which can be unpleasant and difficult to handle. In this way, the user's experience of the system is improved. Furthermore, discarding only the single assembly ensures the power source portion of the system is not wastefully thrown away. The power source may, in any example herein, be rechargeable and therefore not in need of being discarded but rather recharged.

The non-combustible aerosol delivery device may have a generally cylindrical shape, extending along a longitudinal axis, and may comprise two main components, optionally a control body (containing the power source) and a cartomizer (containing the filter unit). The cartomizer may include an internal chamber containing a reservoir of a payload such as for example a liquid comprising nicotine, a vaporizer (such as a heater), and a mouthpiece. References to 'nicotine' herein will be understood to be merely exemplary and can be substituted with any suitable active ingredient. References to 'liquid' as a payload herein will be understood to be merely exemplary and can be substituted with any suitable payload such as botanical matter (for example tobacco that is to be heated rather than burned), or a gel comprising an active ingredient and/or flavoring. The reservoir may comprise a foam matrix or any other structure for retaining the liquid until such time that it is required to be delivered to the vaporizer. In the case of a liquid/flowing payload, the aerosol generating component is for vaporizing the liquid, and the cartomizer may further include a wick or similar facility to transport a small amount of liquid from the reservoir to a vaporizing location on or adjacent the aerosol generating component. In the present disclosure, a heater is used as a specific example of an aerosol generating component. However, it will be appreciated that other forms of aerosol generating component (for example, those which utilize ultrasonic waves) could also be used and it will also be appreciated that the type of aerosol generating component used may also depend on the type of payload to be vaporized.

The power source may include a re-chargeable cell or battery to provide power to the non-combustible aerosol delivery system. The power source may also include a circuit board for generally controlling the non-combustible aerosol delivery system. In an example, when the aerosol generating component receives power from the battery, which may be controlled by the circuit board, the aerosol generating component vaporizes the liquid and this vapor is then inhaled by a user through a mouthpiece. In some specific embodiments the body is further provided with a manual activation device, e.g., a button, switch, or touch sensor located on the outside of the body.

The control body and cartomizer may be detachable from one another, but are joined together when the system is in use by a connection to provide mechanical and electrical connectivity between the control body and the cartomizer. The electrical connector on the control body 20 that is used to connect to the cartomizer may also serve as a socket for connecting a charging device (not shown) when the control body is detached from the cartomizer. The other end of the charging device may be plugged into a USB socket to re-charge the cell in the control body of the non-combustible aerosol delivery device which may be an e-cigarette. In other implementations, a cable may be provided for direct connection between the electrical connector on the control body and a USB socket.

The non-combustible aerosol delivery device is provided with one or more holes for air inlets. These holes connect to an air passage through the electronic aerosol provision device to the mouthpiece. When a user inhales through the mouthpiece, air is drawn into this air passage through the one or more air inlet holes, which are suitably located on the outside of the non-combustible aerosol delivery device. When the heater is activated to vaporize the nicotine from the cartridge, the airflow passes through, and combines with, the generated vapor, and this combination of airflow and generated vapor then passes out of the mouthpiece to be inhaled by a user. Except in single-use devices, the cartomizer may be detached from the control body and disposed of when the supply of liquid is exhausted (and replaced with another cartomizer if so desired).

In some cases, the non-combustible aerosol delivery device may comprise means to control aspects of the airflow in the system. A portion of the airflow pathway providing a fluid communication path between the mouthpiece and one or more air inlet holes in the device to may be provided with features which are movable to change the shape of the airflow pathway (e.g., the topology of the walls bounding the air flow path), and thereby change characteristics of airflow in the non-combustible aerosol delivery device. For instance, movable features (such as valves, baffles, or inlets) may enable modification of operating parameters such as the resistance to draw of the system, the degree of turbulence in the airflow pathway, the direction of airflow in the vicinity of aerosol generating component, and the condensation path distance between the aerosol generating component and the mouthpiece.

In some examples, the resistance to draw of the device can be modified by providing means to selectively open or close one or more air inlets configured to allow air into the air passage comprised in the device. In some examples, elements may be provided to change the direction of airflow into or out of the system. In this way, the flow paths of inhalate airflow path A and exhalate airflow path B may be controlled. For example, a slider may be provided on the outer housing of the system, configured to be moved to different positions (e.g., rotated about an axis or displaced along an axis). The slider may be mechanically or electrically connected so as to cause a resulting change in the pathways A, B such as via movement of a baffle or valve or the like.

In some examples, the slider may be actuated by an electromechanical actuator such as a linear or rotational actuator, and the actuator position controlled by the control circuitry to adjust the position of components controlling the form of airflow paths A, B. Other features may be included in the device to modify the airflow through the device, controlled by the control circuitry in a similar manner. For example, one or more moveable baffles, or a mechanical aperture, or one or more air inlets may be disposed in an air passage of the system near the aerosol generating component or, e.g., the mouthpiece. These features may be moved into different positions to adjust the manner in which incident airflow exits the aerosol generating component or enters/exits the mouthpiece of the system.

For example, one or more baffles may be moved to direct airflow into portion P1 of the pathway through the system 200 (during inhalation) and into portion P2B of the pathway through the system 200 (during exhalation).

It will be appreciated that the non-combustible aerosol delivery devices shown in FIGS. 1 to 3 are presented by way of example, and various other implementations can be adopted. For example, in some embodiments, the cartomizer may be provided as two separable components, namely a cartridge comprising the liquid reservoir and mouthpiece (which can be replaced when the liquid from the reservoir is exhausted), and an aerosol generating component comprising a heater (which is generally retained). As another example, the charging facility may connect to an additional or alternative power source, such as a car cigarette lighter.

As used herein, non-combustible aerosol provision systems, or non-combustible aerosol delivery systems, are systems that release compounds from an aerosol-generating material without combusting the aerosol-generating material, such as electronic cigarettes, tobacco heating products, and hybrid systems to generate aerosol using a combination of aerosol-generating materials.

According to the present disclosure, a "non-combustible" aerosol provision system is one where a constituent aerosol-generating material of the aerosol provision system (or component thereof) is not combusted or burned in order to facilitate delivery of at least one substance to a user.

In some embodiments, the delivery system is a non-combustible aerosol provision system, such as a powered non-combustible aerosol provision system.

In some embodiments, the non-combustible aerosol provision system is an electronic cigarette, also known as a vaping device or electronic nicotine delivery system (END), although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

In some embodiments, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some embodiments, the hybrid system comprises a liquid or gel aerosol-generating material and a solid aerosol-generating material. The solid aerosol-generating material may comprise, for example, tobacco or a non-tobacco product.

In some embodiments, the non-combustible aerosol provision system may comprise a non-combustible aerosol provision device and a consumable for use with the non-combustible aerosol provision device.

In some embodiments, the disclosure relates to consumables comprising aerosol-generating material and configured to be used with non-combustible aerosol provision devices. These consumables are sometimes referred to as articles throughout the disclosure.

In some embodiments, the non-combustible aerosol provision system, such as a non-combustible aerosol provision device thereof, may comprise a power source and a controller. The power source may, for example, be an electric power source or an exothermic power source. In some embodiments, the exothermic power source comprises a carbon substrate which may be energized so as to distribute power in the form of heat to an aerosol-generating material or to a heat transfer material in proximity to the exothermic power source.

In some embodiments, the non-combustible aerosol provision system may comprise an area for receiving the consumable, an aerosol generator, an aerosol generation area, a housing, a mouthpiece, a filter and/or an aerosol-modifying agent.

In some embodiments, the consumable for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

The foregoing discussion discloses and describes merely exemplary embodiments of the present disclosure. As will be understood by those skilled in the art, the present disclosure may be embodied in other specific forms without departing from the essential characteristics thereof. Accordingly, the content of the present disclosure is intended to be illustrative, but not limiting of the scope of the disclosure, as well as of the claims. The disclosure, including any readily discernible variants of the teachings herein, defines, in part, the scope of the foregoing claim terminology.

The invention claimed is:

1. A non-combustible aerosol delivery system for filtering exhaled breath, the non-combustible aerosol delivery system comprising:
   a power source;
   a mouthpiece;
   a filter unit;
   a unit containing a vapor forming material;
   an inhalate airflow path adapted to convey vapor generated by the aerosol delivery system to a user during an inhalation, and
   an exhalate airflow path adapted to convey breath from the user to the filter unit during an exhalation into the aerosol delivery system;
   wherein the filter unit and the unit containing the vapor forming material together form a single assembly which is removable from the non-combustible aerosol delivery system;
   wherein:
   the inhalate airflow path and the exhalate airflow path are entirely distinct from each other; or
   the mouthpiece forms both a portion of the inhalate airflow path and a portion of the exhalate airflow path, and is configured to move between an inhalation position and an exhalation position, wherein in the inhalation position the mouthpiece is in fluid communication with a remainder of the inhalate airflow path and is not in fluid communication with a remainder of the exhalate airflow path, and wherein in the exhalation position the mouthpiece is not in fluid communication with the remainder of the inhalate airflow path and is in fluid communication with the remainder of the exhalate airflow path; or
the non-combustible aerosol delivery system further comprises a diverter assembly, wherein the diverter assembly comprises a multi-flap valve, wherein flaps of the multi-flap valve have a thickness of no greater than 0.7 mm.

2. The non-combustible aerosol delivery system of claim 1, wherein the inhalate airflow path and the exhalate airflow path are entirely distinct from each other.

3. The non-combustible aerosol delivery system of claim 1, wherein the mouthpiece forms both a portion of the inhalate airflow path and a portion of the exhalate airflow path, and is configured to move between the inhalation position and the exhalation position, wherein in the inhalation position the mouthpiece is in fluid communication with the remainder of the inhalate airflow path and is not in fluid communication with the remainder of the exhalate airflow path, and wherein in the exhalation position the mouthpiece is not in fluid communication with the remainder of the inhalate airflow path and is in fluid communication with the remainder of the exhalate airflow path.

4. The non-combustible aerosol delivery system of claim 1, wherein the mouthpiece is hinged so as to rotate between the inhalation position and the exhalation position.

5. The non-combustible aerosol delivery system of claim 1, wherein the mouthpiece is rotatable to move between the inhalation position and the exhalation position.

6. The non-combustible aerosol delivery system of claim 1, wherein the mouthpiece has an inlet port which, in the inhalation position, is in fluid communication with the remainder of the inhalate airflow path and is not in fluid communication with the remainder of the exhalate airflow path, and an outlet port which, in the exhalation position, is not in fluid communication with the remainder of the inhalate airflow path and is in fluid communication with the remainder of the exhalate airflow path.

7. The non-combustible aerosol delivery system of claim 6, wherein the inlet port and the outlet port are the same.

8. The non-combustible aerosol delivery system of claim 6, wherein the inlet port and the outlet port are distinct from each other.

9. The non-combustible aerosol delivery system of claim 6, wherein the mouthpiece is spring loaded to move between the inhalation position and the exhalation position.

10. The non-combustible aerosol delivery system of claim 1, wherein the non-combustible aerosol delivery system further comprises the diverter assembly, wherein the diverter assembly comprises the multi-flap valve, wherein the flaps of the multi-flap valve have a thickness of no greater than 0.5 mm.

11. The non-combustible aerosol delivery system of claim 10, wherein the flaps of the multi-flap valve have a thickness of no greater than 0.3 mm.

12. The non-combustible aerosol delivery system of claim 10, wherein the flaps of the multi-flap valve have a thickness of no greater than 0.1 mm.

13. The non-combustible aerosol delivery system of claim 1, wherein the filter unit contains at least one filter comprising glass fiber, polypropylene, or combinations of glass fiber and polypropylene.

14. The non-combustible aerosol delivery system of claim 1, wherein the filter unit further comprises a separator for separating aerosol droplets from vapor.

15. The non-combustible aerosol delivery system of claim 1 the filter unit comprises at least one deodorizing filter.

16. The non-combustible aerosol delivery system of claim 1, wherein the non-combustible aerosol provision system is an electronic cigarette.

17. The non-combustible aerosol delivery system of claim 1, wherein the non-combustible aerosol provision system is an aerosol generating material heating system.

18. The non-combustible aerosol delivery system of claim 1, wherein the non-combustible aerosol provision system generates aerosol using a combination of aerosol-generating materials, and wherein one or a plurality of the aerosol-generating materials may be heated.

* * * * *